US010614307B2

(12) United States Patent
Stanley

(10) Patent No.: US 10,614,307 B2
(45) Date of Patent: Apr. 7, 2020

(54) VEGETATION CATEGORISATION

(71) Applicant: Point4Geo Ltd., Grantham (GB)

(72) Inventor: Martin Stanley, Grantham (GB)

(73) Assignee: Point4Geo Ltd., Grantham (GB)

( * ) Notice: Subject to any disclaimer, the term of this patent is extended or adjusted under 35 U.S.C. 154(b) by 0 days.

(21) Appl. No.: 15/511,122

(22) PCT Filed: Sep. 15, 2015

(86) PCT No.: PCT/GB2015/052675
§ 371 (c)(1),
(2) Date: Mar. 14, 2017

(87) PCT Pub. No.: WO2016/042320
PCT Pub. Date: Mar. 24, 2016

(65) Prior Publication Data
US 2017/0277953 A1 Sep. 28, 2017

(30) Foreign Application Priority Data

Sep. 15, 2014 (GB) .................................. 1416281.2

(51) Int. Cl.
*G06K 9/00* (2006.01)
*G01B 11/14* (2006.01)
*G01B 11/28* (2006.01)
*G01S 17/89* (2020.01)
(52) U.S. Cl.
CPC .......... *G06K 9/00657* (2013.01); *G01B 11/14* (2013.01); *G01B 11/28* (2013.01); *G01S 17/89* (2013.01); *G06K 9/00637* (2013.01)

(58) Field of Classification Search
None
See application file for complete search history.

(56) References Cited

U.S. PATENT DOCUMENTS

| 7,474,964 B1 * | 1/2009 | Welty ..................... A01G 23/00 |
| | | 702/2 |
| 8,275,547 B2 * | 9/2012 | Rousselle .............. G06Q 10/10 |
| | | 33/228 |
| 8,352,410 B2 * | 1/2013 | Rousselle .......... G06K 9/00657 |
| | | 706/52 |

(Continued)

FOREIGN PATENT DOCUMENTS

| GB | 2530104 | 3/2016 |
| WO | WO 99/19824 | 4/1999 |

(Continued)

OTHER PUBLICATIONS

International Search Report and the Written Opinion dated Jan. 25, 2016 From the International Searching Authority Re. Application No. PCT/GB2015/052675. (9 Pages).

(Continued)

*Primary Examiner* — Soo Jin Park

(57) ABSTRACT

A method of categorising vegetation is disclosed, the method comprising: inputting and storing in a memory information related to a ground observation; determining the identity of the vegetation of said observations corresponding to an existing memory entry; determining a characteristic for said vegetation in dependence on said ground observation; and updating said memory with said characteristic.

20 Claims, 25 Drawing Sheets

(56) References Cited

U.S. PATENT DOCUMENTS

| | | | | |
|---|---|---|---|---|
| 8,374,431 | B2* | 2/2013 | Dow | G01B 11/24 |
| | | | | 382/173 |
| 8,680,994 | B2* | 3/2014 | Leppanen | G06K 9/00657 |
| | | | | 340/2.81 |
| 8,724,900 | B2* | 5/2014 | Dow | G01B 11/24 |
| | | | | 382/173 |
| 9,069,104 | B2* | 6/2015 | Datta | G01W 1/10 |
| 9,140,548 | B2* | 9/2015 | Dow | G01B 11/24 |
| 9,536,313 | B2* | 1/2017 | Dow | G01B 11/24 |
| 9,742,165 | B2* | 8/2017 | Hyde | H02G 1/02 |
| 9,784,836 | B2* | 10/2017 | Heinonen | G01S 17/08 |
| 9,947,109 | B2* | 4/2018 | Dow | G01B 11/24 |
| 2005/0279069 | A1 | 12/2005 | Novembri | A01B 79/005 |
| | | | | 56/13.1 |
| 2008/0319668 | A1 | 12/2008 | Welty et al. | |
| 2010/0198775 | A1* | 8/2010 | Rousselle | A01B 79/005 |
| | | | | 706/54 |
| 2012/0022822 | A1 | 1/2012 | Rousselle | |
| 2012/0027298 | A1 | 2/2012 | Dow et al. | |
| 2012/0169498 | A1* | 7/2012 | Leppanen | G06K 9/00657 |
| | | | | 340/540 |
| 2015/0131079 | A1* | 5/2015 | Heinonen | G01S 17/08 |
| | | | | 356/4.01 |
| 2017/0277953 | A1 | 9/2017 | Stanley | |

FOREIGN PATENT DOCUMENTS

| | | |
|---|---|---|
| WO | WO 2016/065071 | 4/2016 |
| WO | WO 2018/197862 | 11/2018 |

OTHER PUBLICATIONS

International Search Report and the Written Opinion dated Dec. 13, 2018 From the International Searching Authority Re. Application No. PCT/GB2018/051074. (20 Pages).

Patents Act 1977: Search Report Under Section 17(5) dated Oct. 12, 2017 From the intellectual Property Office of the United Kingdom of Great Britain Re. Application No. GB1706479.1. (6 Pages).

Kobayashi et al. "The Utilization of Satellite Images to Identify Trees Endangering Transmission Lines", IEEE Transactions on Power Delivery, XP011269440, 24(3): 1703-1709, Published Online Jun. 24, 2009.

Mills et al. "An Insurance Perspective on U.S. Electric Grid Disruption Costs", Energy Analysis and Environmental Impacts Division, Lawrence Berkeley National Laboratory, the Geneva Papers on Risk and Insurance—Issues and Practice, 41(4): 555-586, Oct. 2016.

Mills et al. "Evaluation of Aerial Remote Sensing Techniques for Vegetation Management in Power-Line Corridors", IEEE Transactions on Geoscience and Remote Sensing, XP011309408, 48(9): 3379-3390, Published Online May 18, 2010.

Paisitkriangkrai et al. "Semantic Labeling of Aerial and Satellite Imagery", IEEE Journal of Selected Topics in Applied Earth Observations and Remote Sensing, XP011619688, 9(7): 2868-2881, Published Online Jul. 18, 2016.

Wang et al. "Research on Resilience of Power Systems Under Natural Disasters—a Review", IEEE Transactions on Power Systems, XP011599761, 31(2): 1604-1613, Published Online May 12, 2015.

\* cited by examiner

Glenfield-Desford Circuit - Surveyor Site/consent

| Area/Zone | Hinckley |
| Nail No | 123456 |
| Survey Date | 06/01/13 |
| Pole-Pole | 14 - 15 |
| Grid Ref | SK 103 407 |
| Landowner | Mr Jones, Heath Farm Desford 01234 567890 |

| Tree ID: | 1234 |
| Species: | 920 |
| Tree Cat: | B |
| Height | 12 |
| Crown | 9 |
| DBH: | 50 |
| Dist OHL: | 1 |
| Live/Dead | 1 |
| Tree can be felled? | Yes |
| Restricted Cut Revisit | 922 |
| Landowner signed here | |

G552 - Required Clearance: 5m
Final Clearance: 916
like clearance calc: 918
Arisings: Remove all arisings from site Click here to change/generate Work Instruction — 924
Click here to go back to Span information

Figure 11

Glenfield-Desford Circuit - Surveyor Site/Consent

| Field | Value | | Field | Value |
|---|---|---|---|---|
| Area/Zone | Hinckley | | Tree ID: | 1234 |
| Nafn No: | 123456 | | Species | OAK — 920 |
| Survey Date | 05/01/13 | | Tree Cat: | B |
| Pole-Pole | 14 - 15 | | Height | 12 |
| Grid Ref | SK 103 407 | | Crown | 9 |
| Landowner | Mr Jones, Heath Farm, Desford  01234 567890 | | DBH: | 50 |
| | | | Dist O/H L: | 1 |
| G552 - Required Clearance | 5m | | Live/Dead | 1 |
| Final Clearance | 4m — 916 | | Tree can be felled? | Yes |
| ike clearance calc | 2.5m — 918 | | Restricted Cut Revisit. | 05/1/14 — 922 |
| Arisings: | Remove all arisings from site | | Landowner signed here | |

Click here to view/generate Work instructions

Click here to go back to Span information

VEGETATION CATEGORISATION

RELATED APPLICATIONS

This application is a National Phase of PCT Patent Application No. PCT/GB2015/052675 having International filing date of Sep. 15, 2015, which claims the benefit of priority of United Kingdom Patent Application No. 1416281.2 filed on Sep. 15, 2014. The contents of the above applications are all incorporated by reference as if fully set forth herein in their entirety.

FIELD AND BACKGROUND OF THE INVENTION

This invention relates to a system, apparatus and method for categorising vegetation.

Utility conductors such as power cables and telecommunication cables are required to span large distances in order to provide power and/or communications across a wide area. An efficient way of doing this whilst maintaining access to the conductor is to suspend the conductor overhead between poles (or pylons). However, this creates a problem when traversing areas of vegetation as this may encroach onto the conductor, either by falling onto, or by growing around the conductor and/or poles.

Typically, a 'network operator' is responsible for any outages resulting from such damage; these entities often employ contractors to monitor a particular stretch of conductor and pruning or removal of vegetation as necessary. Such a process is very labour intensive and potential problems can be easily missed. Furthermore, frequent inspections are necessary so as to account for vegetation growth or storm damage. Similar problems exist in other fields such as railways, waterways, roads, or other infrastructure where reducing the risk vegetation impact/incursion is desired.

More recently, the inspection process has been carried out by aircraft using aerial photographs (as in WO03094109 A2, for timber stock auditing) or LiDAR (Light-Radar, or sometimes referred to as 'Light Detection And Ranging') (as in US 2012/0169498 A1, for tree-health assessment). Again, this process can easily miss potential problems, and contractors are still required to determine how to remedy any identified problems.

The problem of vegetation encroaching onto conductors is exacerbated by increased power usage which heats the conductors and makes them expand and sag. Global warming has also had an impact on this problem as higher ambient temperatures further contribute to such expansion; global warming also extends and accelerates the growing season of the surrounding vegetation.

There is thus a need to solve or reduce at least some of the aforementioned problems.

SUMMARY OF THE INVENTION

According to one aspect of the present invention there is provided a method of categorising vegetation as potential impact vegetation on a target object, the method comprising: determining data relating to target vegetation; determining data relating to the target object; categorising said vegetation into one of a plurality of different risk categories in dependence on said data relating to target vegetation and said data relating to the target object; and optionally assigning a remedial action to said vegetation in dependence on said categorisation. By categorising said vegetation into one of a plurality of different risk categories more efficient operation of vegetation management is afforded.

The method may further comprise submitting a ground observation to a memory comprising said data sets. The method may further comprise determining the identity of the vegetation of said observations corresponding to an existing memory entry.

Preferably, the method may comprise determining an updated risk category for said vegetation in dependence on said ground observation; and updating said memory with said risk category. By updating said risk category, an accurate and up-to-date record of the state of the vegetation is afforded.

The risk category may correspond to a set of regulations.

The assigning of a remedial action may comprise outputting a statement of suggested remedial action based on said data relating to said target vegetation. Outputting a statement of suggested remedial action allows for more efficient management of the vegetation. The statement of suggested remedial action may comprise a recommendation of resource allocation for completing the said remedial action; the resources may comprise at least one of: personnel; equipment; and time.

According to another aspect of the present invention there is provided a method of categorising vegetation, the method comprising: inputting and storing in a memory information related to a ground observation; determining the identity of the vegetation of said observations corresponding to an existing memory entry; determining a characteristic for said vegetation in dependence on said ground observation; and updating said memory with said characteristic. By updating the memory with a characteristic for the vegetation in dependence on a ground observation an accurate and up-to-date record of the state of the vegetation is afforded.

The method may further comprise outputting a statement of suggested remedial action based on said characteristic.

Preferably the characteristic is a risk category, and the risk category may correspond to a set of regulations. In one example, four categories of risk are provided, each corresponding to a different level or type of risk posed by the vegetation. A greater or lower number of categories may be provided, for example two categories corresponding to no risk (or negligent risk) and some risk.

The characteristic may comprise a part of a polygon shape, and the part of the polygon shape may represent a locus from a point or points of measurement.

In an alternative example, the characteristic may comprise a 3-dimensional visualisation.

The characteristic may comprise a measurement corresponding to a closest distance between said vegetation and an object. This distance may be informative as to the risk the vegetation poses to the target object.

In one example, the ground observations may be related to recently undertaken remedial action.

The information related to a ground observation may comprise a distance measurement from said vegetation to said target object; the distance may be measured by means of back-scattered light (LiDAR). The distance measurement may comprise at least one of: a fall-arc distance, and a closest distance. These measurements may be informative as to the risk the vegetation poses to the target object The location of the ground observation may be determined so as to determine the identity of the vegetation; in one example said location is a Global Positioning System (GPS) location.

Preferably, a mobile device is used to record said ground observation; the ground observation may be wirelessly transmitted from said mobile device to a central server containing said memory, and said transmission may be via satellite communication.

The location and orientation of the mobile device may be used to determine the identity of the vegetation. The identity of said vegetation may be determined from a location of mobile device, and the distance and bearing from said device to the point of measurement. By using the location and orientation of the mobile device and/or the distance and bearing from said device to the point of measurement, an accurate location of the target vegetation may be inferred, and thus identifying the target vegetation with an existing memory entry.

The method may further comprise outputting a conformance report based on said updated characteristic.

According to another aspect of the present invention there is provided a method of categorising vegetation as potential impact vegetation on a target object, the method comprising: determining a first set of data relating to target vegetation; determining data relating to the target object; determining a second set of data relating to said target vegetation; determining the growth rate of said target vegetation from said first and second data sets; and predicting a future data set relating to said target vegetation in dependence on said growth rate. By predicting a future data set relating to said target vegetation in dependence on said growth rate a forecast of the future status of the vegetation may be provided to a user, resulting in a potentially more efficient management of vegetation.

The method may further comprise categorising said vegetation into one of a plurality of different risk categories in dependence on said future data set, and in one example further comprises scheduling a remedial action for said vegetation in dependence on said categorisation. By scheduling a remedial action for said vegetation in dependence on said categorisation potential disadvantages associated with vegetation growth may be be avoided.

In one example, the first and second data sets may be temporally separated, for example the temporal separation is at least one growing season.

Alternatively or in conjunction, the second data set may correspond to weather and/or climate conditions; these conditions may be known past conditions or predicted future conditions.

The scheduling of the remedial action may be related to a time when the risk category of said target vegetation is predicted to change. By doing so, potential disadvantages associated with vegetation growth may be avoided.

In one example, data relating to related vegetation may be used to predict said future data set relating to said target vegetation. This may allow vegetation with little or no second data sets to be augmented with data which is related to them so as to provide a predicted growth rate and/or improve the accuracy of an existing prediction.

The method may further comprise outputting a predicted consequence in dependence on said categorisation. This may inform a user as to a vegetation management decision. The predicted consequence may comprise a predicted outage.

Preferably the target object is a conductor.

In one example, the data sets are derived at least in part from back-scattered light (LiDAR) data. LiDAR data allows for accurate measurement of a wide area.

Alternatively, or in conjunction, the data sets are derived at least in part from images; the images may be multi-spectral images, and the images may be photographs.

Preferably, determining data relating to target vegetation comprises identifying individual elements of vegetation. This allows for a very accurate model of the vegetation to be created.

Identifying individual elements of vegetation may comprise attributing a vegetation element with a polygon; said polygon may be determined by analysing height measurements of the vegetation element. Alternatively, or additionally, said polygon may be determined by analysing density measurements of the vegetation element. Preferably, said polygon may be determined by a seeded region growth method.

According to yet another aspect of the present invention there is provided a system for categorising vegetation at risk as potential impact vegetation, the system comprising: a server comprising a central memory (optionally in the form of a database) containing data related to a target object and neighbouring vegetation; a mobile device operable to record data relating to said target object and/or vegetation; wherein the server is operable to receive said data from said mobile device so as to categorise said vegetation in said memory. By categorising the vegetation in the memory based on data relating to said target object and/or vegetation from the mobile device, an accurate and up-to-date model of the vegetation and/or target object can be provided.

In one example, the system comprises a wireless link between said mobile device and server; the wireless link may a satellite link.

The server may be operable to receive said data from said mobile device via a web-page or application. This affords ease of use for the user of the mobile device.

According to another aspect, there is provided an apparatus for categorising vegetation as potential impact vegetation on a target object, the apparatus comprising: means for determining (for example, comprising a processor and associated memory) a first set of data relating to target vegetation; means for determining (for example, comprising a processor and associated memory) data relating to the target object; means for determining (for example, comprising a processor and associated memory) a second set of data relating to said target vegetation; means for determining the growth rate of said target vegetation from said first and second data sets; and means for predicting (for example, comprising a processor and associated memory) a future data set relating to said target vegetation in dependence on said growth rate.

According to another aspect, there is provided an apparatus for categorising vegetation as potential impact vegetation on a target object, the apparatus comprising: means for determining (for example, comprising a processor and associated memory) data relating to target vegetation; means for determining (for example, comprising a processor and associated memory) data relating to the target object; and means for categorising (for example, comprising a processor and associated memory) said vegetation into one of a plurality of different risk categories in dependence on said data relating to target vegetation and said data relating to the target object.

According to another aspect, there is provided a mobile device for recording data relating to a target object and/or vegetation, the device comprising: means for recording (for example, comprising of a processor and associated memory) data relating to said target object and/or vegetation; means for transmitting (for example in the form of a processor, associated memory and aerial) said data to a server; means for receiving (for example, comprising a processor, associated memory and aerial) a conformance report from the server based on said data.

Preferably, the mobile device comprises a wireless transmitter to transmit said data wirelessly to said server. Preferably said wireless transmitter comprises a satellite transmitter.

The mobile device preferably comprises means for determining a location of said target object and/or vegetation; for example by way of a GPS module (together with a processor and associated memory).

Preferably, the means for determining the location of said target object and/or vegetation comprises means for determining (for example, comprising a processor and associated memory) a distance and bearing from said device to the point of measurement. The means for determining a distance from said device to the point of measurement may comprise a laser transmitter and receiver.

The invention extends to any novel aspects or features described and/or illustrated herein. Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

In this specification the word or can be interpreted in the exclusive or inclusive sense unless stated otherwise.

The invention extends to methods and/or apparatus substantially as herein described with reference to the accompanying drawings.

BRIEF DESCRIPTION OF THE SEVERAL VIEWS OF THE DRAWINGS

The invention will now be described by way of example with reference to the following Figures:

FIG. 11 shows an example site report prior to a site visit;

FIG. 12 shows the site report of FIG. 10 following a site visit;

FIG. 13 shows a screen shot of a form to 'generate work instructions'; and

DESCRIPTION OF SPECIFIC EMBODIMENTS OF THE INVENTION

Figure 1A:
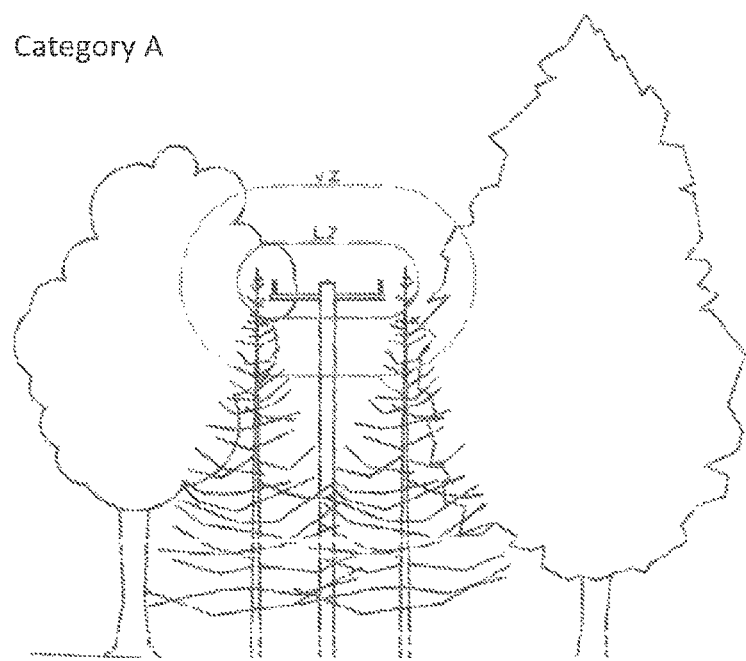
FIGS. 1(a)-(d) shows four categories of vegetation risk.

In this specification, the term 'vegetation' refers to any type of vegetation, including trees, tree crowns, bushes, weeds, grass, vines and also to non-living vegetation such as dead trees or dead branches.

The following terms used in this specification may have the following meaning:

Live Zone: The zone around an exposed live Circuit Conductor or supporting insulators where there is a danger of burn or electric shock if any part of a person's body or non-insulated tool they are using enters the Zone. For high voltage (HV) circuit conductors this is related to the "Safety Distance" as described by the Network Operator. The distances, which depend on voltage, are shown in Table 1.

Network Operator: The organisation that owns and/or operates a distribution network and who may be responsible for keeping vegetation clear of overhead lines. A Network Operator might also be referred to as a Distribution Network Operator (DNO) or Transmission Systems Operator (TSO). Such operators may be bound to follow certain regulations and expectations when maintaining their section of the network; example sets of regulations include ENA (Energy Network Association) G55/2, Electricity Safety, Quality and Continuity Regulations, and Engineering Technical Report (ETR) 132.

Proximity: Close enough to electrical equipment to present a danger. Depending on the type of operation, the definition of Proximity may be split in to Proximity Zone 1 and Proximity Zone 2:

Proximity Zone 1: In the case of felling works then this includes all trees that are within two tree lengths of any live equipment. This is typically measured horizontally from a point directly beneath the nearest conductor to the base of the tree.

Proximity Zone 2: Includes all trees that are to be dismantled, pruned or have other arboricultural work carried out on them that are within:

9 m of any live equipment up to and including 66 kV 15 m of any live equipment greater than 66 kV This distance is typically measured horizontally from a point directly beneath the nearest conductor to a point directly under the nearest point of the canopy of the tree.

Where mechanical plant is being used e.g. harvesters or forwarders, then the stated distances are typically measured to the nearest point to the line that any part of the machine or load can reach.

Vicinity Zone: The zone around an exposed live Circuit Conductor, which if maintained will ensure that the danger of burn or electric shock is prevented because the Live Zone is not breached. The Live Zone is included within the measurement of the Vicinity Zone. Example distances, which depend on voltage, are shown in Table 1.

TABLE 1

Example Live and Vicinity Zone Distances

| System Voltage | Live Zone | Vicinity Zone |
|---|---|---|
| Up to and including 1 kV | 0.3 m | 1 m |
| Up to and including 11 kV | 0.8 m | 2 m |
| Up to and including 33 kV | 0.8 m | 2.5 m |
| Up to and including 66 kV | 1.0 m | 3 m |
| Up to and including 132 kV | 1.4 m | 3.5 m |
| Up to and including 275 kV | 2.4 m | 4 m |
| Up to and including 400 kV | 3.1 m | 5 m |

Vegetation may pose a danger to an overhead conductor in a number of different ways; these different risks can be grouped into four categories (in typical order of risk severity) as shown in FIG. 1:
  A. Vegetation present within the live zone.
  B. Vegetation capable of breaching the vicinity zone.
  C. Vegetation growing beneath the conductor within the vicinity zone.
  D. Vegetation within proximity of the conductor but not capable of breaching the vicinity zone.

Each category of vegetation danger has different remedial actions, ranging from having to de-power the conductor and using specialist equipment, to using normal (e.g. non-insulated) tools without any need to work in the vicinity of the conductor. It is thus useful for contractors to be able to know the category of vegetation so that they can deploy the appropriate personnel and tools and potentially to request permission from land-owners/network operators prior to a physical site inspection. This would reduce the time to complete the remedial action and the associated cost of Customer Minutes Lost (CML—a measurement related to the number of people affected by an outage and the duration of that outage).

Figure 2:
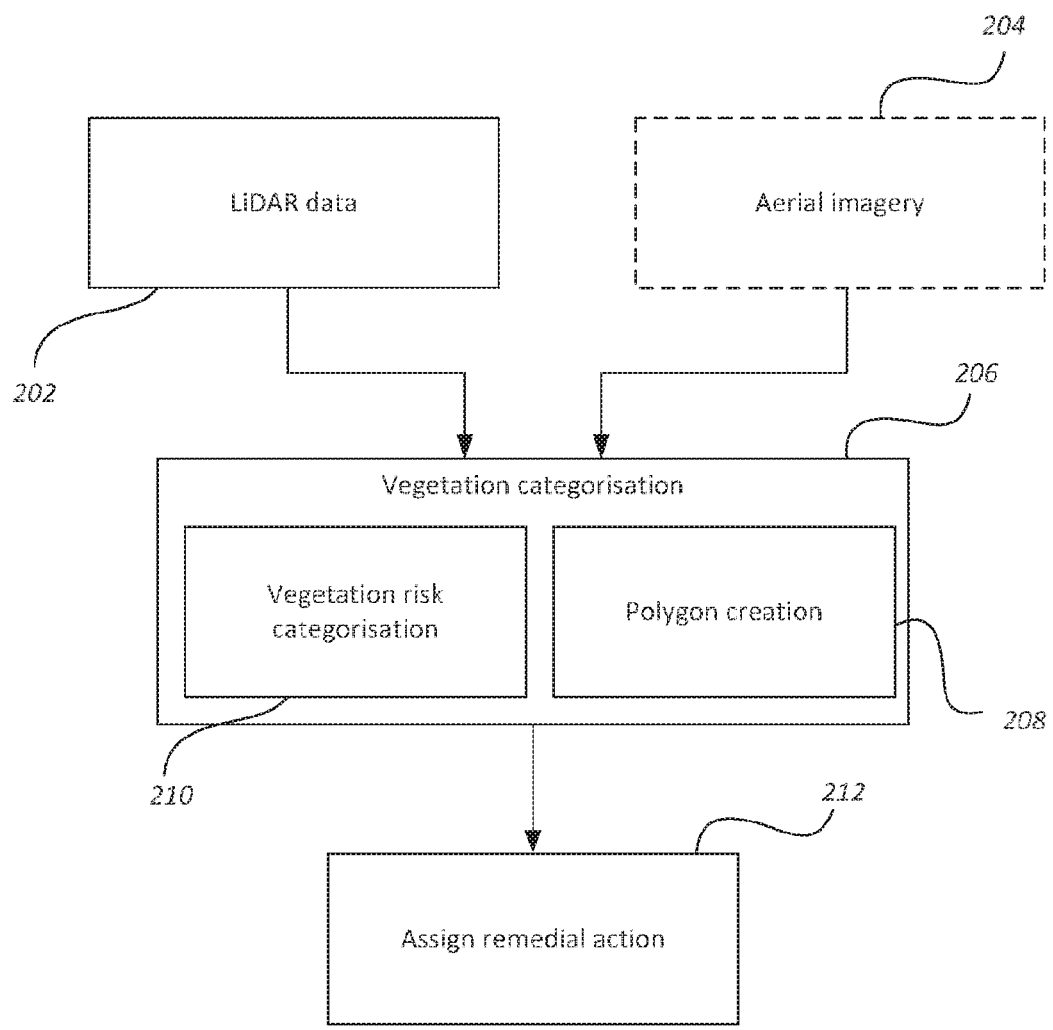
FIG. 2 shows an overview flow diagram for assigning remedial action to vegetation.

A flow diagram showing the various steps leading to assignment of a remedial action is shown in FIG. 2.

Data relating to the conductors and neighbouring vegetation is determined at least in part from LiDAR data at step 202, for example taken from an aircraft flying over the conductor. Alternatively, or additionally, this data may be determined from satellite LiDAR data. The latter would likely provide a lower resolution but enable much wider coverage. In a further example, the LiDAR data may be determined using Unmanned Arial Vehicles (UAVs) or Remotely Operated Arial Vehicles (ROAVs)—also referred to as 'drones'; this provides the advantages of detailed coverage as UAVs may be able to fly lower than manned aircraft and may be more cost-effective in certain locations than manned aircraft. The data may be augmented by aerial photographs at step 204 (again, for example taken by an aircraft or satellite) and/or on-the-ground measurements. Aerial photographs may be used for other purposes such as plotting/inspection of assets (e.g. the condition of wooden poles, extent of rot/decay, the condition of conductors, corrosion on pylons) and measuring tree vigour by the spectral response (e.g. colour) of trees. Multispectral cameras may be used to determine the spectral response in wavelengths outside the visible range to give an indication of tree vigour which would not be visible to the human eye.

Such measurements can produce a detailed three-dimensional image of the conductor and the neighbouring vegetation by measuring distances between the LiDAR device and the target which the light beam back-reflects from; examples of such images are shown in FIG. 3. This distance may be determined by measuring the intensity of the back-reflected beam (incoherent), or using phase information of the back-reflected beam (coherent). In many cases, resolution down to several centimetres is possible, allowing an extremely accurate mapping of the location of vegetation with respect to a conductor. For example, the height of a tree and the position of its trunk can be determined, which allows for categorisation of the risk a particular tree poses to the conductor. A density measurement can be determined by the number of beams that back-scatter; such a measurement can be used to determine the extent of a particular tree and provide information as to the likely difficulty in pruning/removal.

In use LiDAR data is collected as described above, preferably augmented with aerial images and/or GPS data so that the LiDAR data can be overlayed onto a map (for example, Google® Maps and/or the network operator's existing mapping system). In one example, an aircraft flies directly over the path of a conductor, collecting information regarding the conductor and its immediate vicinity.

The LiDAR data is processed so that a three-dimensional image of the conductor is generated enabling precise location of the conductors themselves and the poles supporting them. Example images showing this are shown in FIG. 3(b)—depicting a perspective view of a conductor with different colours/shading indicating the height of the element above ground level, 3(c)—depicting vegetation laterally offset from a conductor, 3(d)—depicting a tree at risk of falling onto a conductor, and 3(e)—showing a stretch of conductor between two pylons with a measurement of the height of a conductor over a train track.

Figure 4:
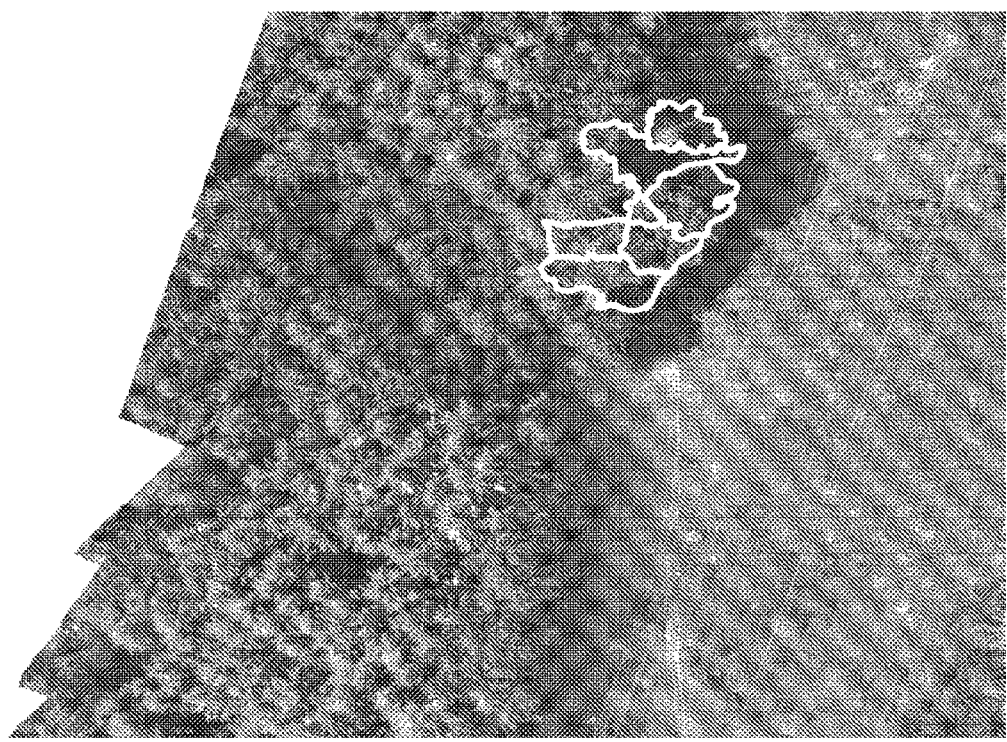
FIG. 4 shows an example aerial image with tree 'polygons' superimposed.

The surrounding vegetation is then analysed. Each tree (or other element of vegetation) is identified and a polygon corresponding approximately to its crown is generated at step 208. This may be performed by determining the location of a stem for example by determining a local maximum in height of an area of vegetation. The crown of a tree can be determined by a 'seeded region growing method' whereby maximum height points are determined and then neighbouring pixels with a similar height to that maximum are assigned to the same region. This method is iterative, generating an area which is bordered by a difference in height greater than a pre-determined threshold. This method is described in more detail in US 2012/0169498 A1—Leppanen et al. Alternatively, polygons may be determined by analysing the height of the surrounding vegetation, for example, the crown of a particular tree may be defined by the line at which the height of vegetation above the ground reduces to zero (i.e. a tree on its own) or where the height of surrounding vegetation starts increasing (i.e. a tree with neighbouring trees/vegetation). This analysis produces polygons corresponding to the extent of a particular item of vegetation as illustrated in FIG. 4.

Figure 1B:
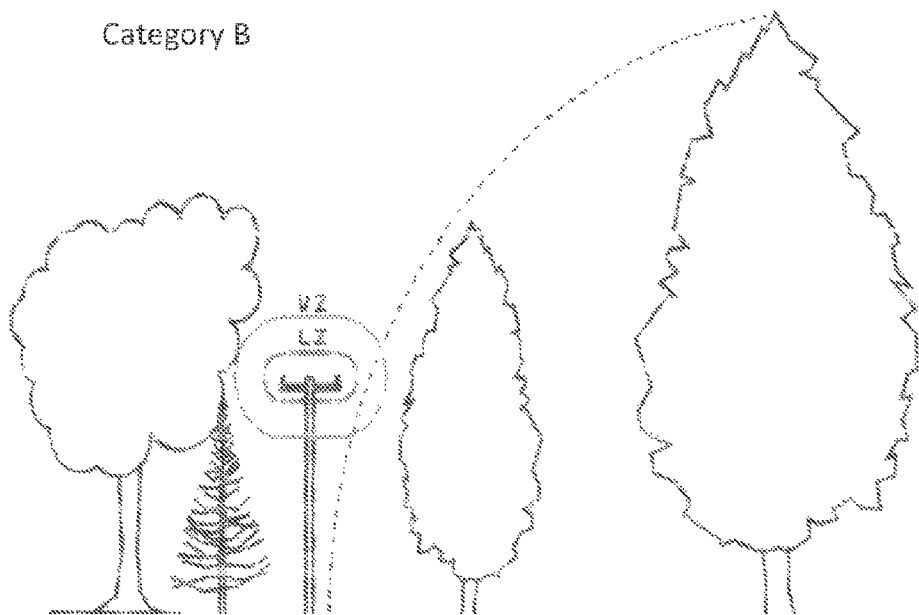
Figure 1C:
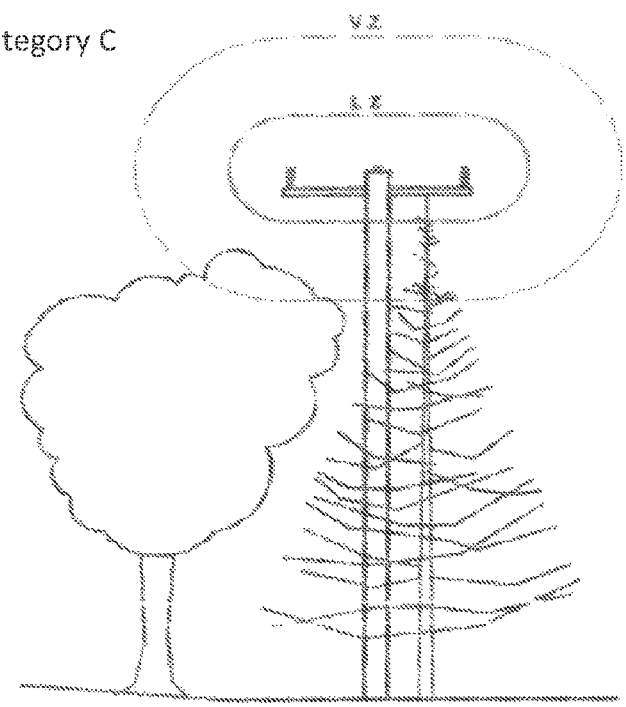
Figure 1D:
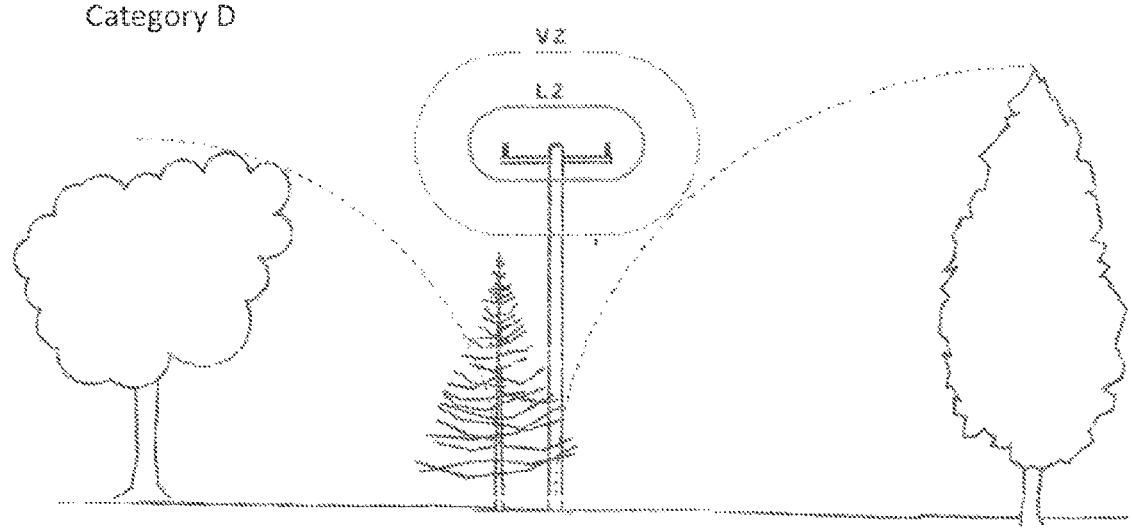
Figure 5A:
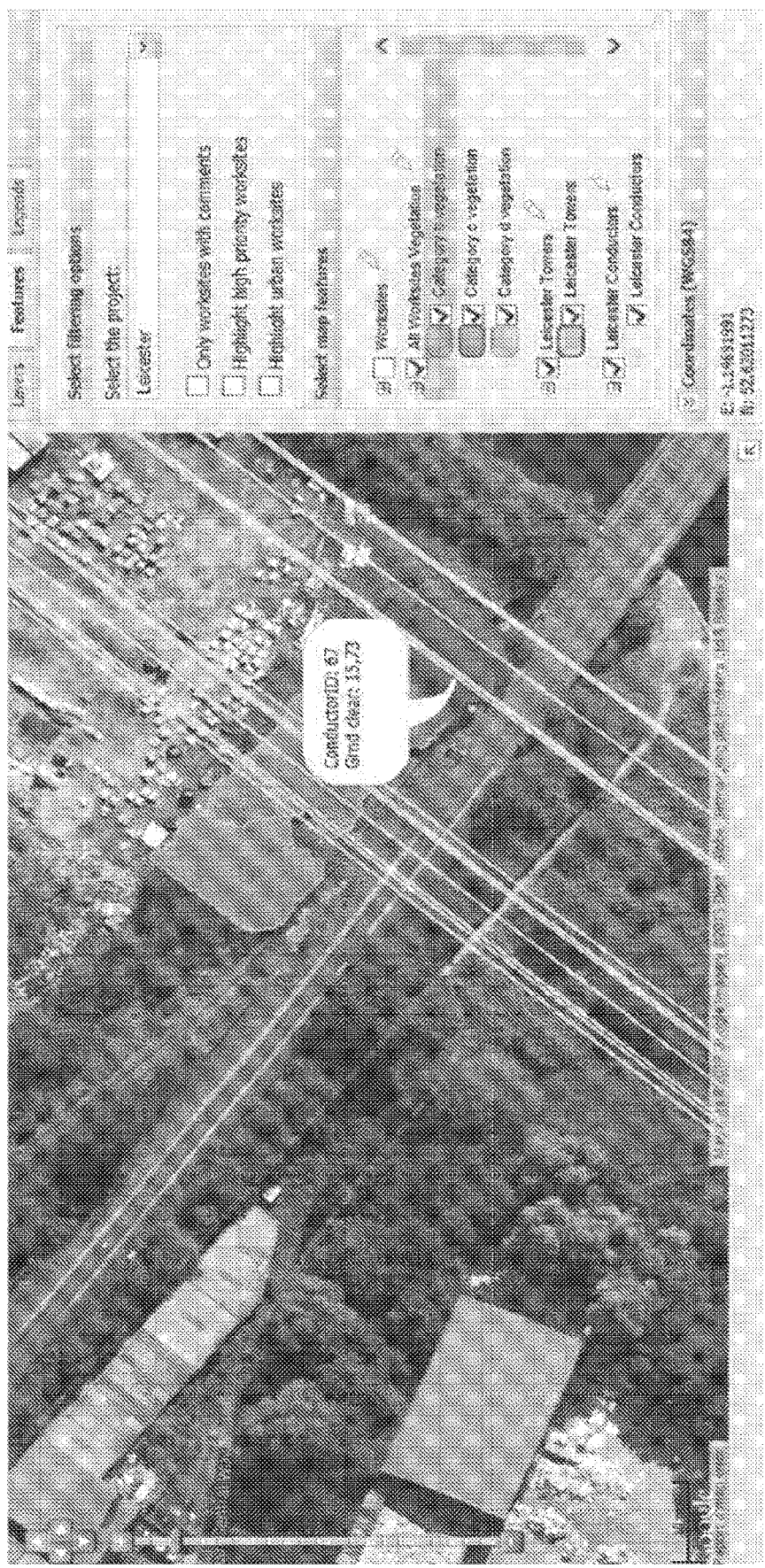
FIGS. 5(a) and (b) show categorised tree polygons around a conductor.
Figure 5B:
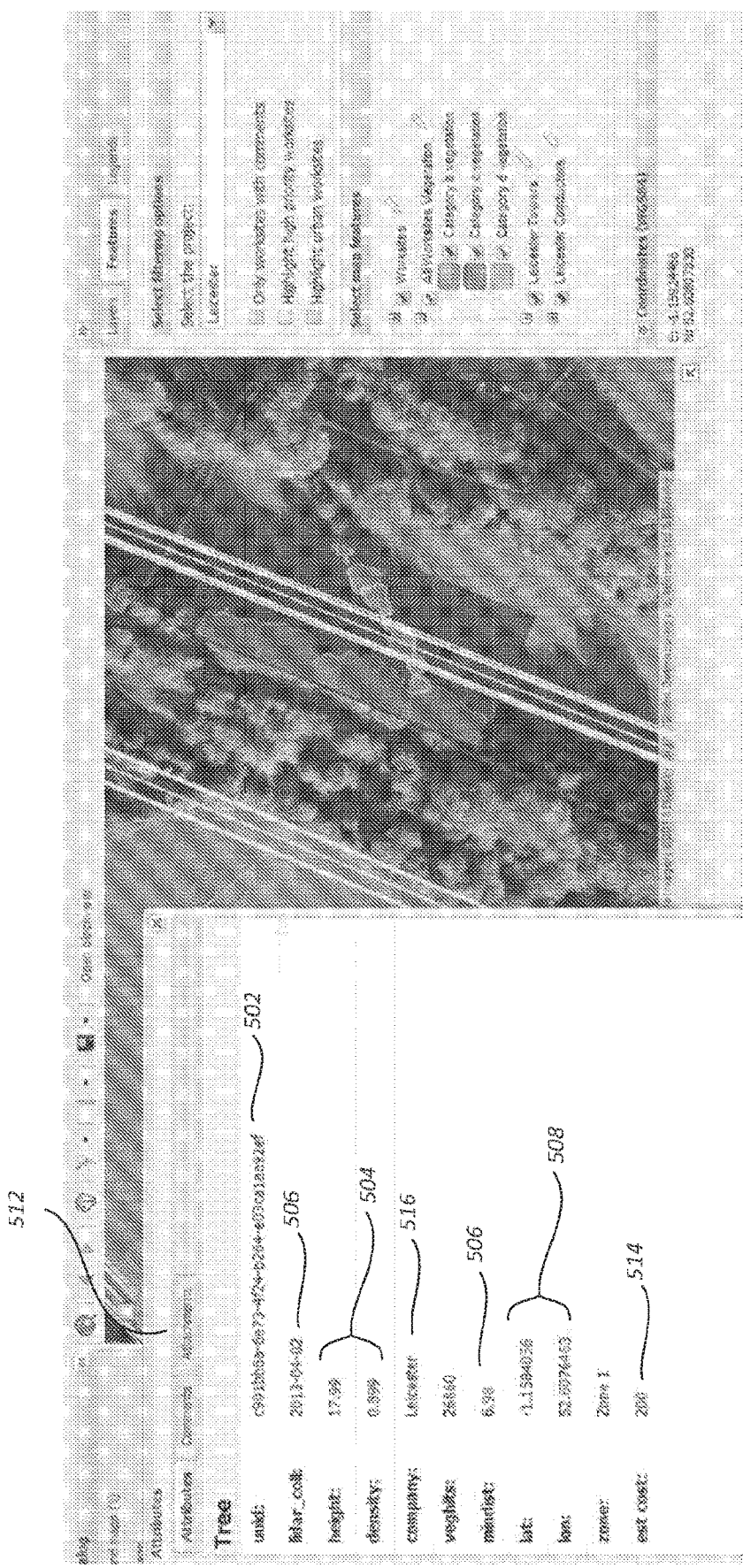
FIGS. 5(c) and (d) show categorised tree polygons corresponding to a second scan at a later time.
FIGS. 5(e) and (f) show vegetation growth based on a two scans of the same vegetation.
FIGS. 5(g) and (h) show predicted categorised tree polygons based on growth estimation.
Figure 5C:
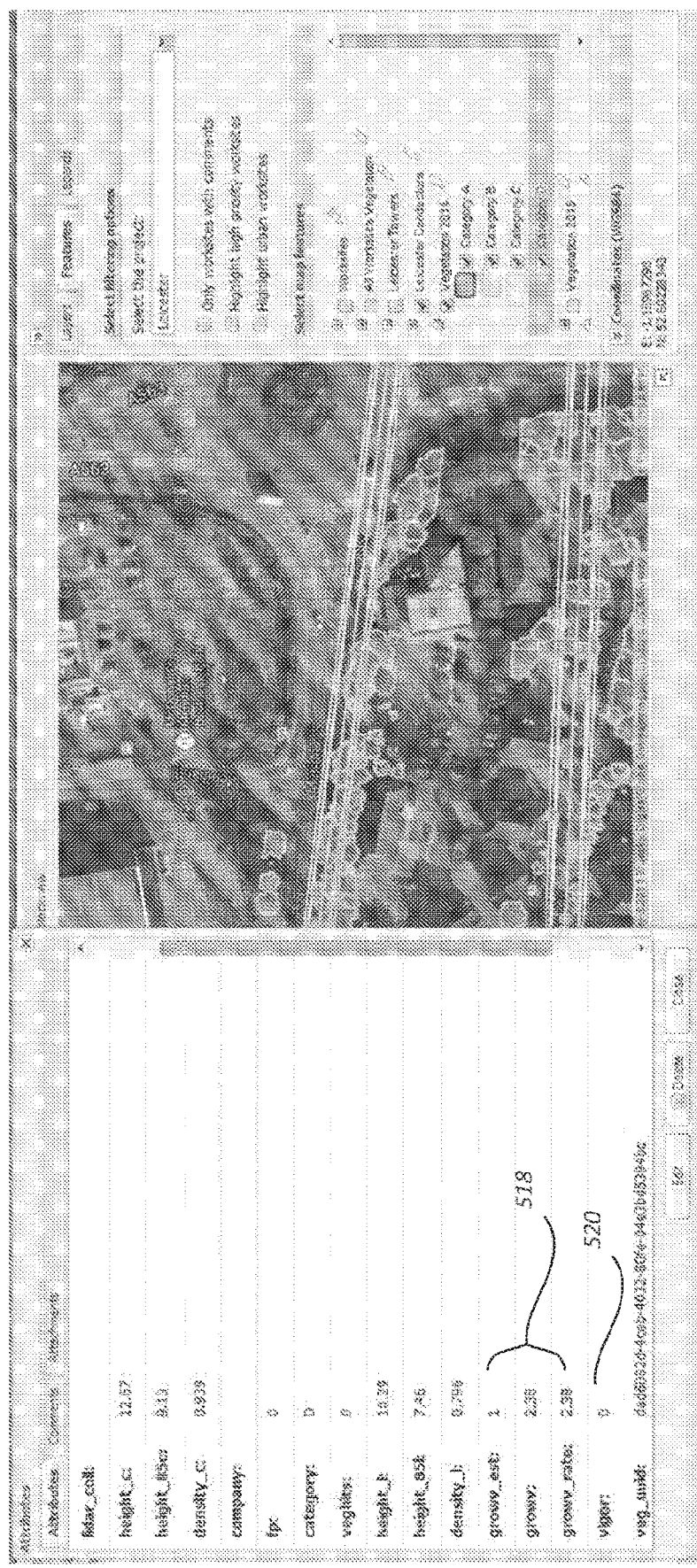

The next step 210 is to categorise each polygon of vegetation compared to relevant legislation or guidelines—for example the categories described above with reference to FIG. 1. In this step, the 3D image is processed to determine distances between a particular part of vegetation and the conductor. This may be a vertical distance beneath the conductor (e.g. FIG. 3(a)), the lateral distance to the conductor, or it may be a measure of the 'fall distance'—a combination of lateral distance to the tree stem and tree height (as shown in FIGS. 1(b) and (d)). Following this categorisation stage, each polygon is depicted according to its category—as shown in FIG. 5(a). Upon selecting a polygon, a user is provided with relevant information relating to the polygon (as shown in FIG. 5(b)). This may include information such as:

Vegetation identifier 502
Risk category
Vegetation height, size, density 504
Closest distance to conductor 506
GPS co-ordinates 508
Time/date of measurement 510
Links to LiDAR imagery (in 'attachments' 512)
Links to on-the-ground imagery 512
Indicative cost of remedial action (if necessary) 514
Land-owner information/permission 512
Tree species
Contractor information 516
Tree vigour (520—FIG. 5(c))
Previous remedial action time/date and other relevant information Based on this information, a statement of work may be sent to a contractor assigning remedial action (step 212), detailing what needs to be done to the vegetation corresponding to that particular polygon. Such statements of work may be generated automatically by the system or manually by an operator.

Once the remedial action has been completed, typically the contractors would report this to the network operator who would update their records accordingly. This process is susceptible to abuse as it is very hard to conduct an audit of contractor's work; any shortcomings likely only to become apparent during the next inspection or when a conductor fails because of vegetation encroachment.

Figure 5D:
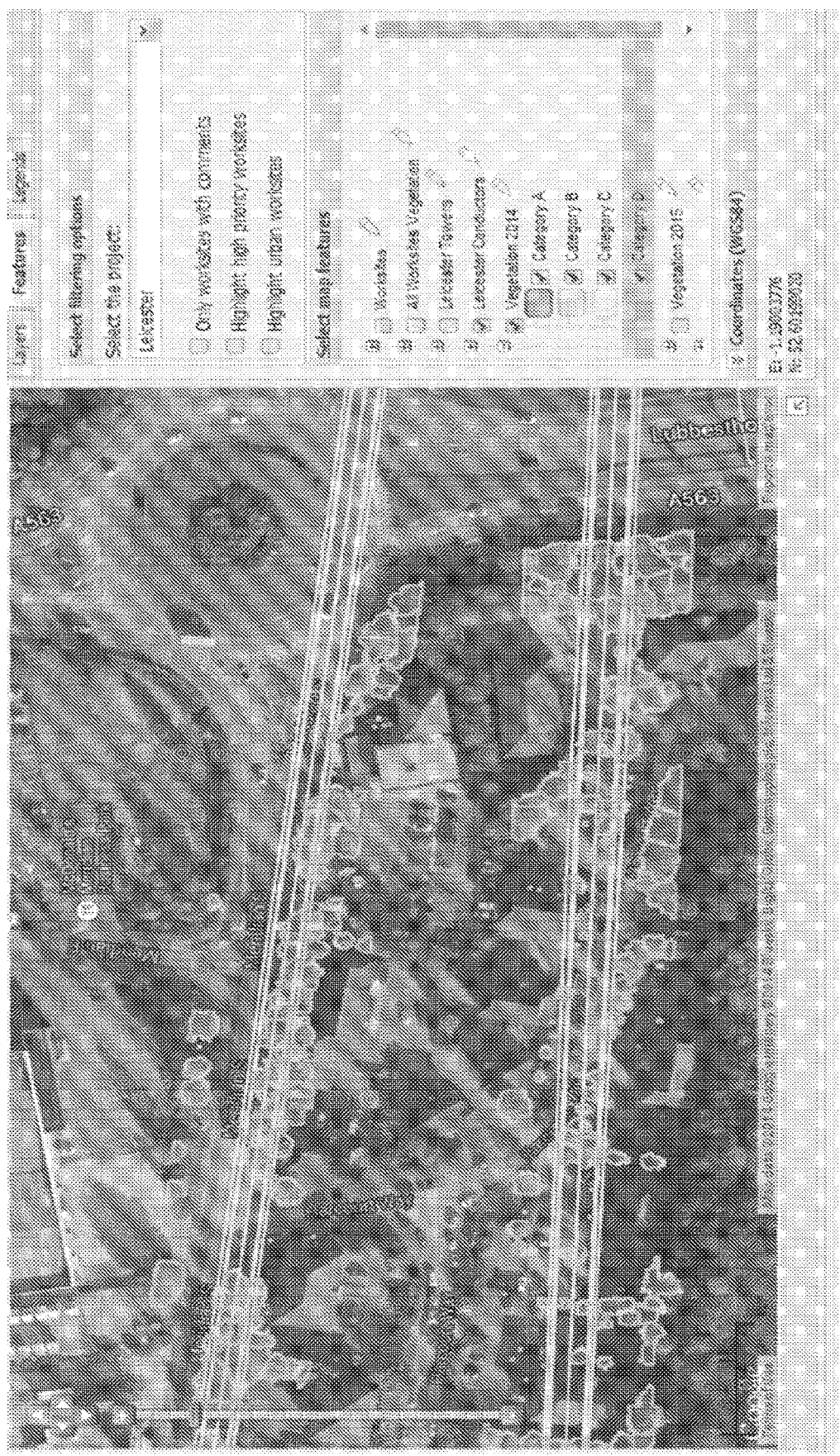

FIGS. 5(c) and 5(d) show an example map overlayed with polygons similar to FIG. 5(a), this particular stretch having been scanned twice, each scan temporally separated by approximately one year (2013, and 2014). The two sets of data can be compared so as to determine the growth rate of the vegetation in that area (accounting for vegetation that has been cut—this information would be stored by the system). Various indicators of the growth rate are shown as attributes 518 in FIG. 5(c). Once the growth rate has been determined for a particular element of vegetation, it is then possible to extrapolate into the future so as to determine when a particular element of vegetation may interfere with a conductor. This extrapolation (prediction) may be based on the first and second data sets corresponding to the two scans of the vegetation, or it could take into account other data sets such as predicted/known weather conditions (e.g. next summer is predicted to be wetter than last summer) or longer-term weather/climate changes such as global warming or sun-spot occurrences. In some examples, a combination of measurements and predicted weather factors influence the prediction as to the future extent/state of the vegetation with respect to a target object. A number of different growth measures may be used; for example, certain areas of a polygon may be deemed growing faster vertically or horizontally than others.

Figure 5E:
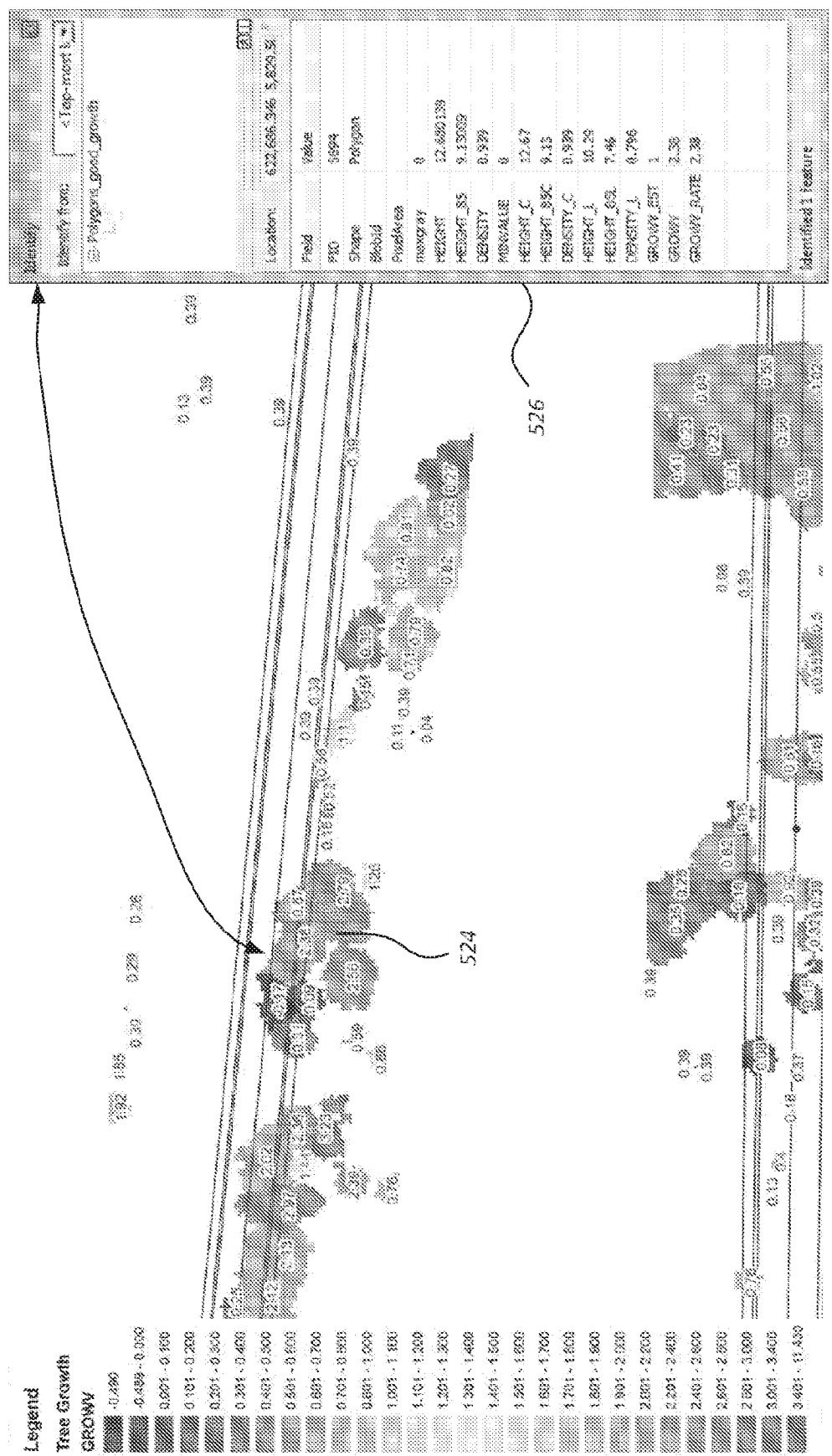

FIG. 5(e) shows a growth measure (in this example, vertical growth—GROWV) superimposed onto a map showing vegetation polygons and conductors. The measure of tree growth is indicated as the colour of the polygon (as shown in the key on the left hand side) and also as a number on each polygon. In the example shown, the user has selected polygon 524 and an information box 526 is displayed indicating various measurements related to the growth rate.

Figure 3A:
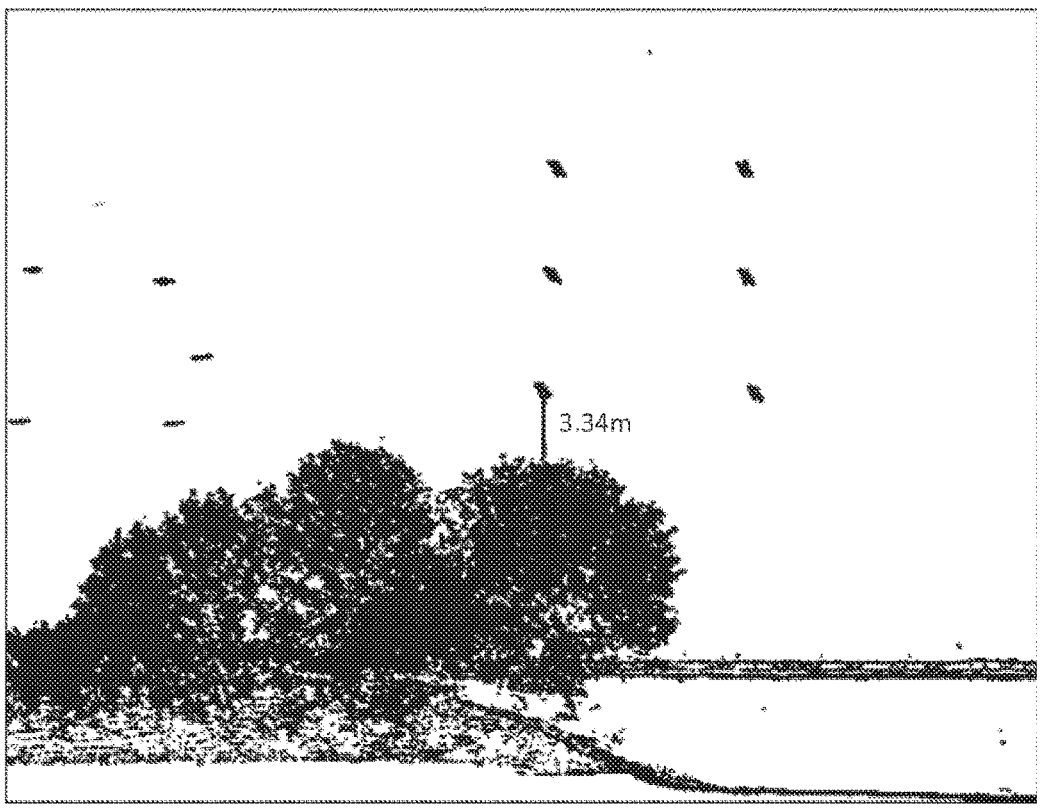
FIGS. 3(a)-(e) show example 3D images of conductors and neighbouring vegetation.
Figure 3B:
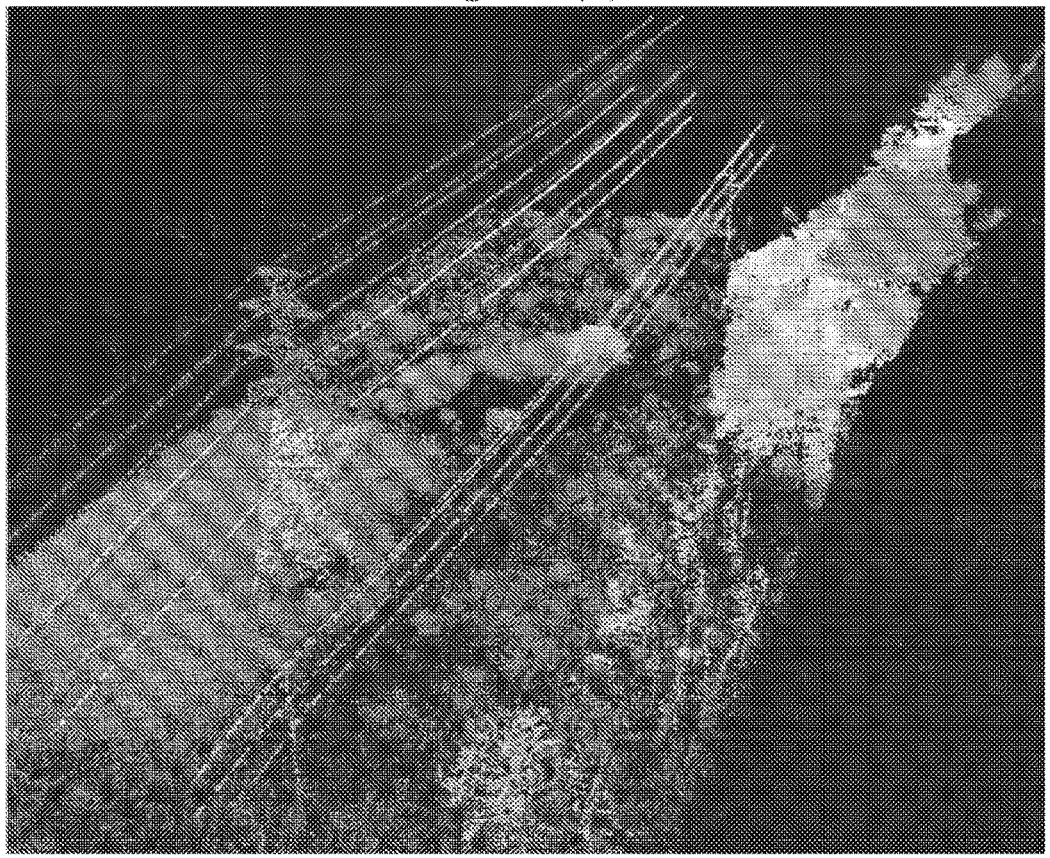
Figure 3C:
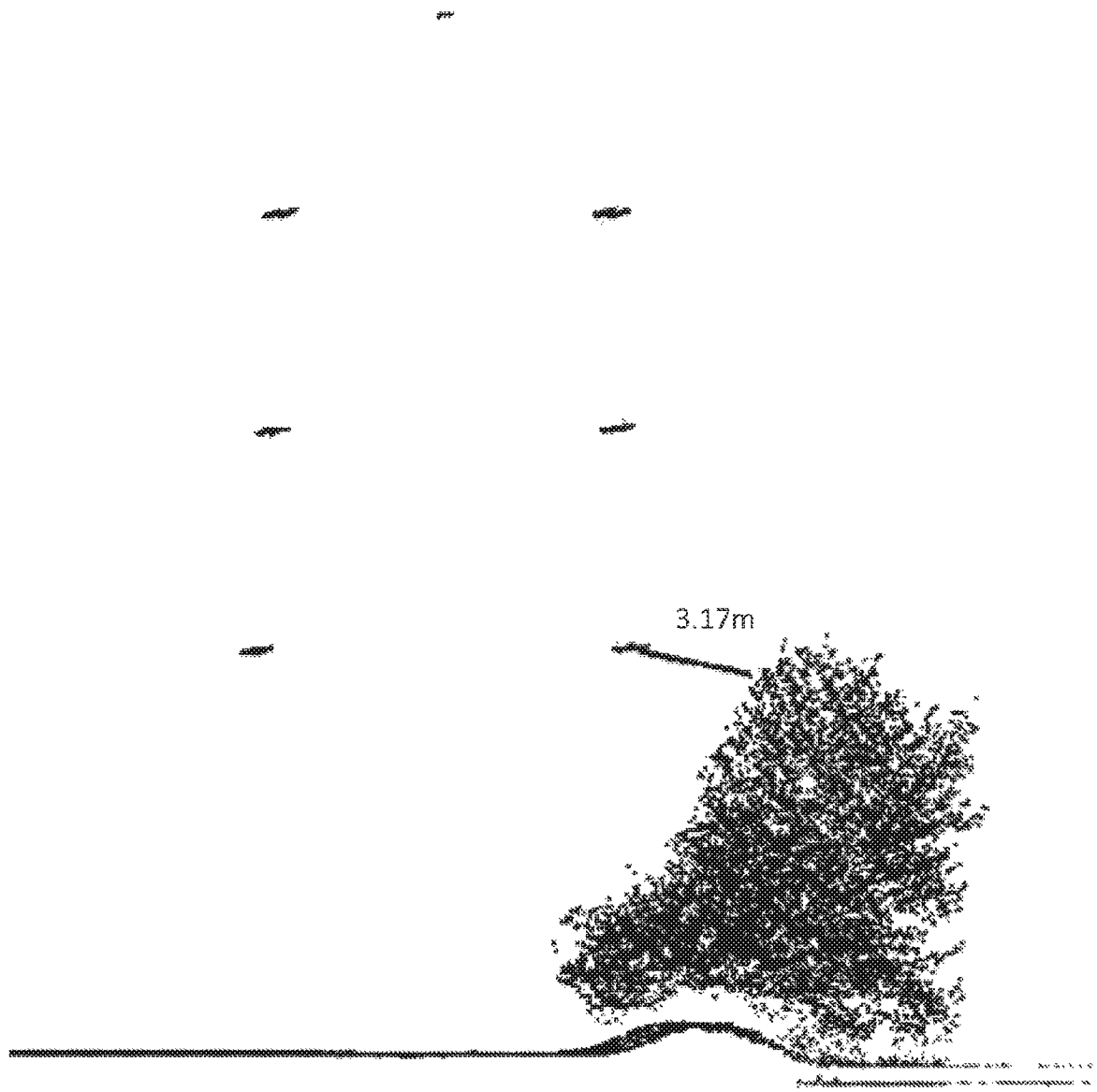
Figure 3D:
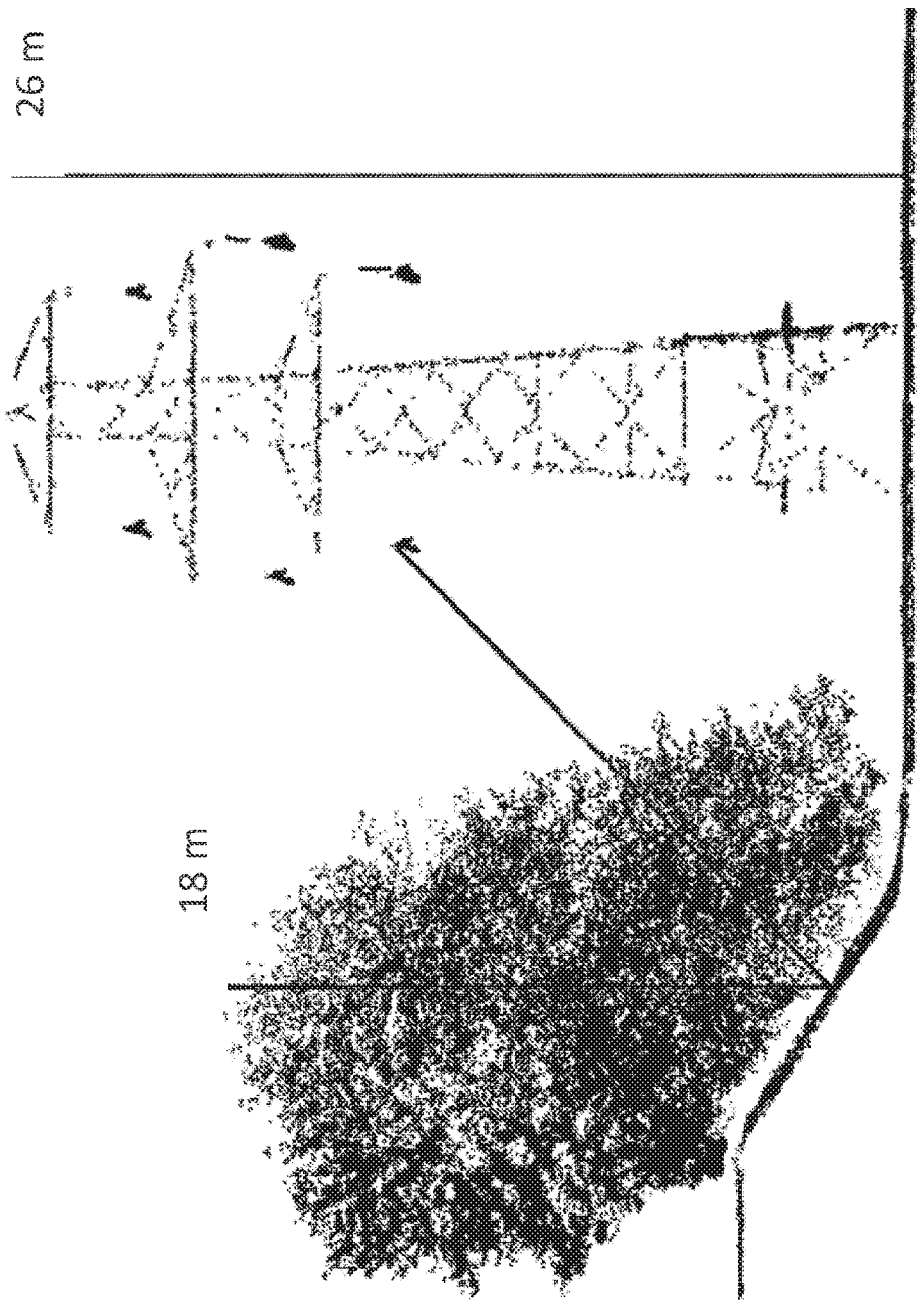
Figure 3E:
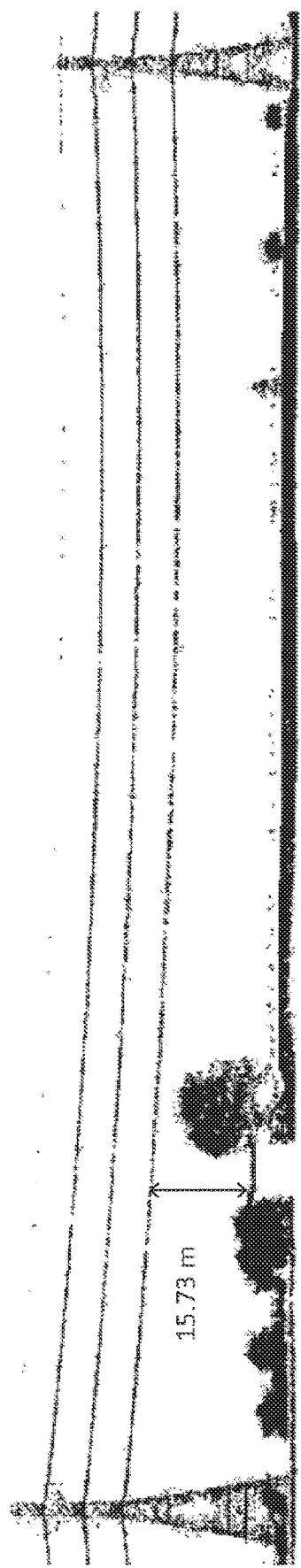
Figure 5F:
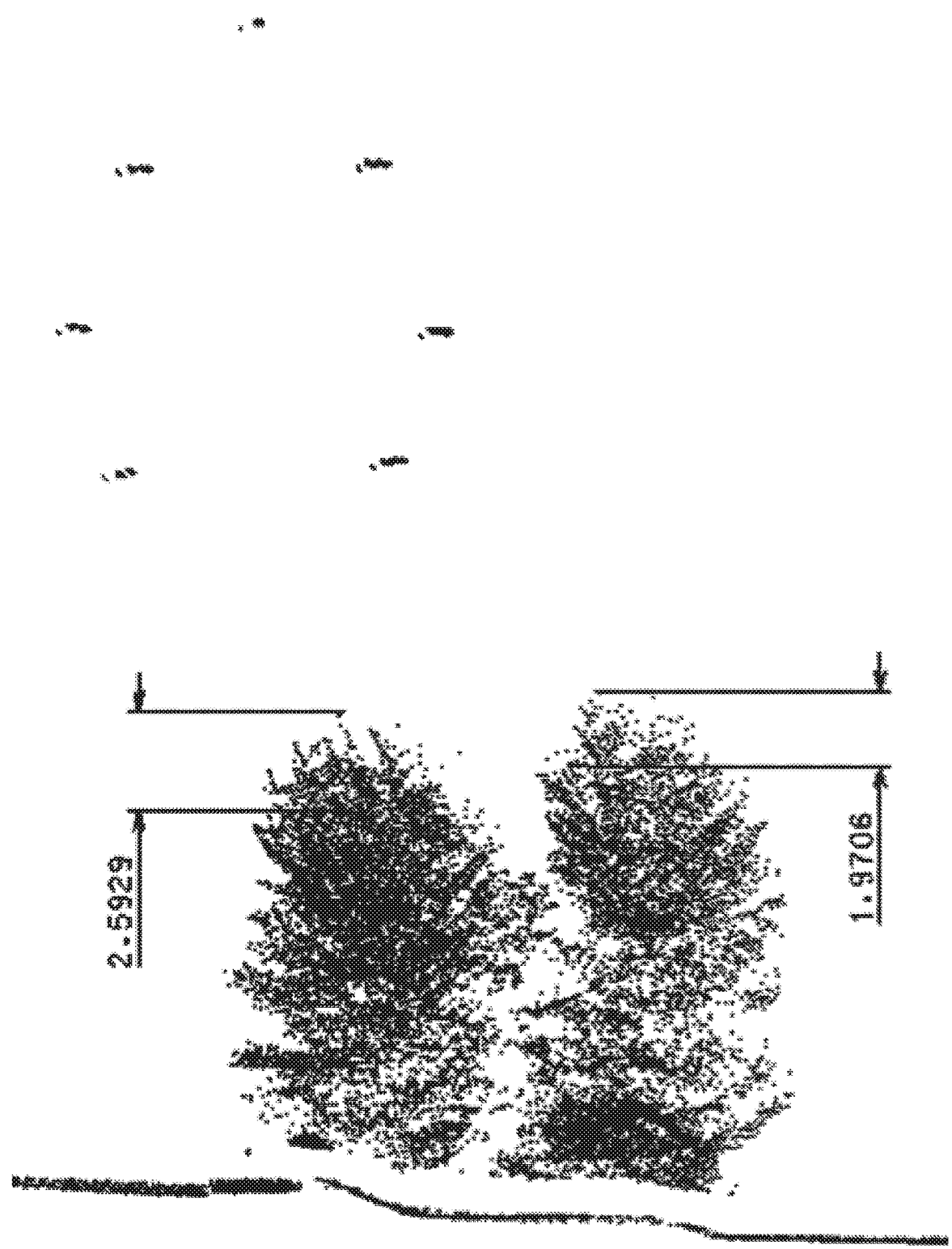

FIG. 5(f) shows a LiDAR image similar to those shown in FIGS. 3(a), (c) and (d), but rather than indicating a distance to a conductor, it shows the growth of the vegetation as compared to the previous scan. In this example, the tree on the left has grown 2.5929 m vertically in the time between the two scans, and the tree on the right 1.9706 m. This granularity of data allows for individual growth rates to be assigned to individual elements of vegetation.

Figure 5G:
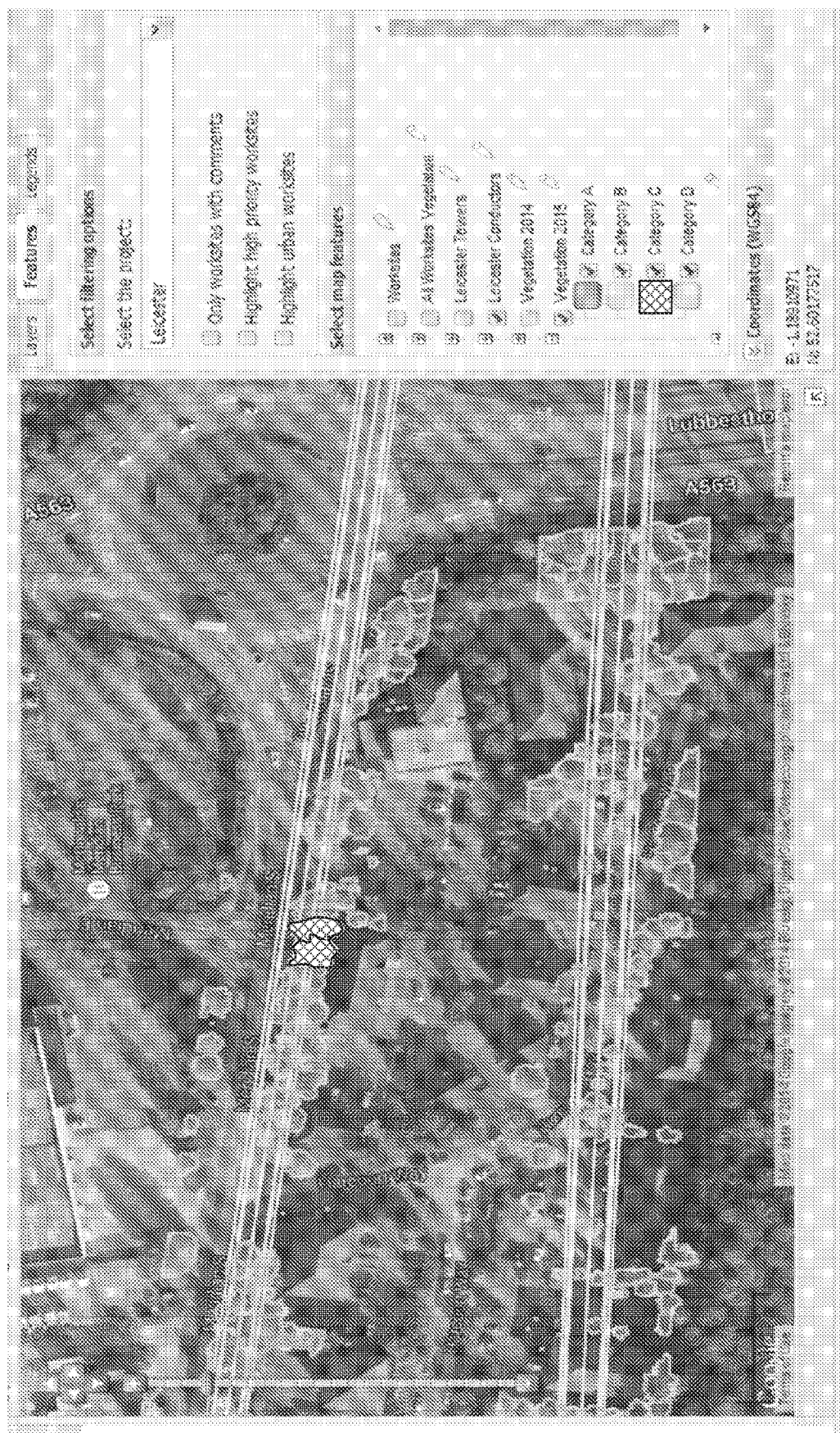
Figure 5H:
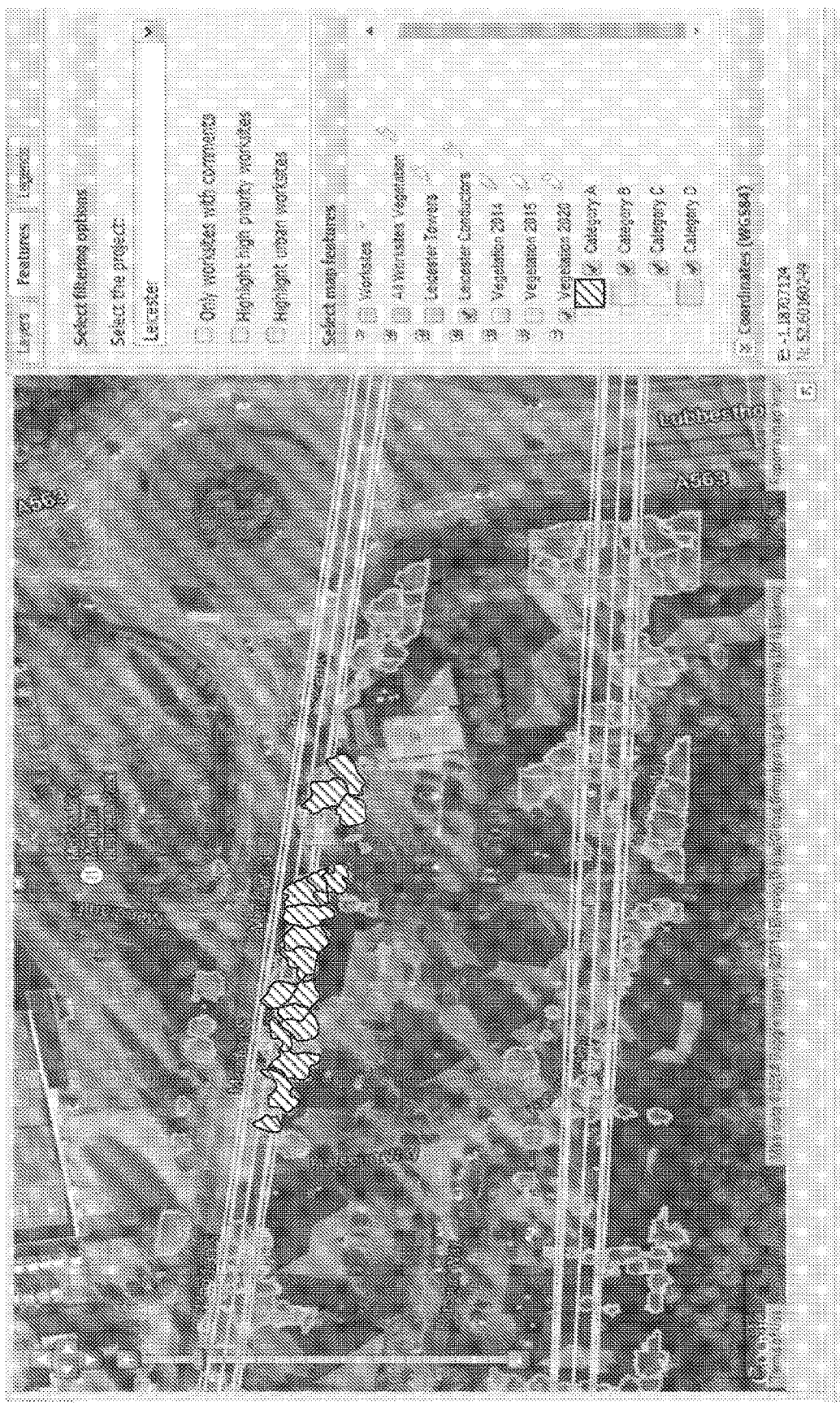

FIGS. 5(g) and 5(h) show predicted polygons corresponding to one (FIG. 5(g)) and five (FIG. 5(h)) years later. Some polygons have changed category—indicating that remedial action would then be necessary. In the example shown, two polygons are predicted to change from category D to C by 2015, and numerous polygons predicted to change to category A by 2020. The system can determine when remedial action would be necessary so as to avoid a particular element of vegetation posing a significant risk (e.g. changing from category D to C, C to B, or B to A) and can schedule remedial action at a time related to this date (e.g. prior to or around this date). This scheduled remedial action may include scheduling a further scan and/or ground visit. Such a system allows network operators and contractors to accurately plan the likely amount, cost and location of future work and thus can allocate resources accordingly.

This predictive aspect allows network operators to proactively manage the network rather than reactively managing problems as and when they are found. Consequences of vegetation growth (for example future outages) can be predicted by the network operator, which can influence how they manage the network. For example "Tree 1234 will become category A around Jan. 1, 2020 and thus the appropriate remedial action will require de-energisation of span 5678", remedial action can then be scheduled prior to when any such outages would be required. This results in less customer minutes lost (CML) and a more efficient operation of the network (because it is cheaper and easier to rectify category B vegetation than category A for example).

It will be appreciated that more than two scans of the same area could be used to improve the accuracy of the growth model, and that the scans may be temporally separated by more or less than one year, for example by one or two growing seasons, preferably by at least one growing season. Furthermore, data from similar vegetation (for example, those experiencing a similar climate) may be applied to other vegetation so as to provide an indication of future growth.

Figure 7:
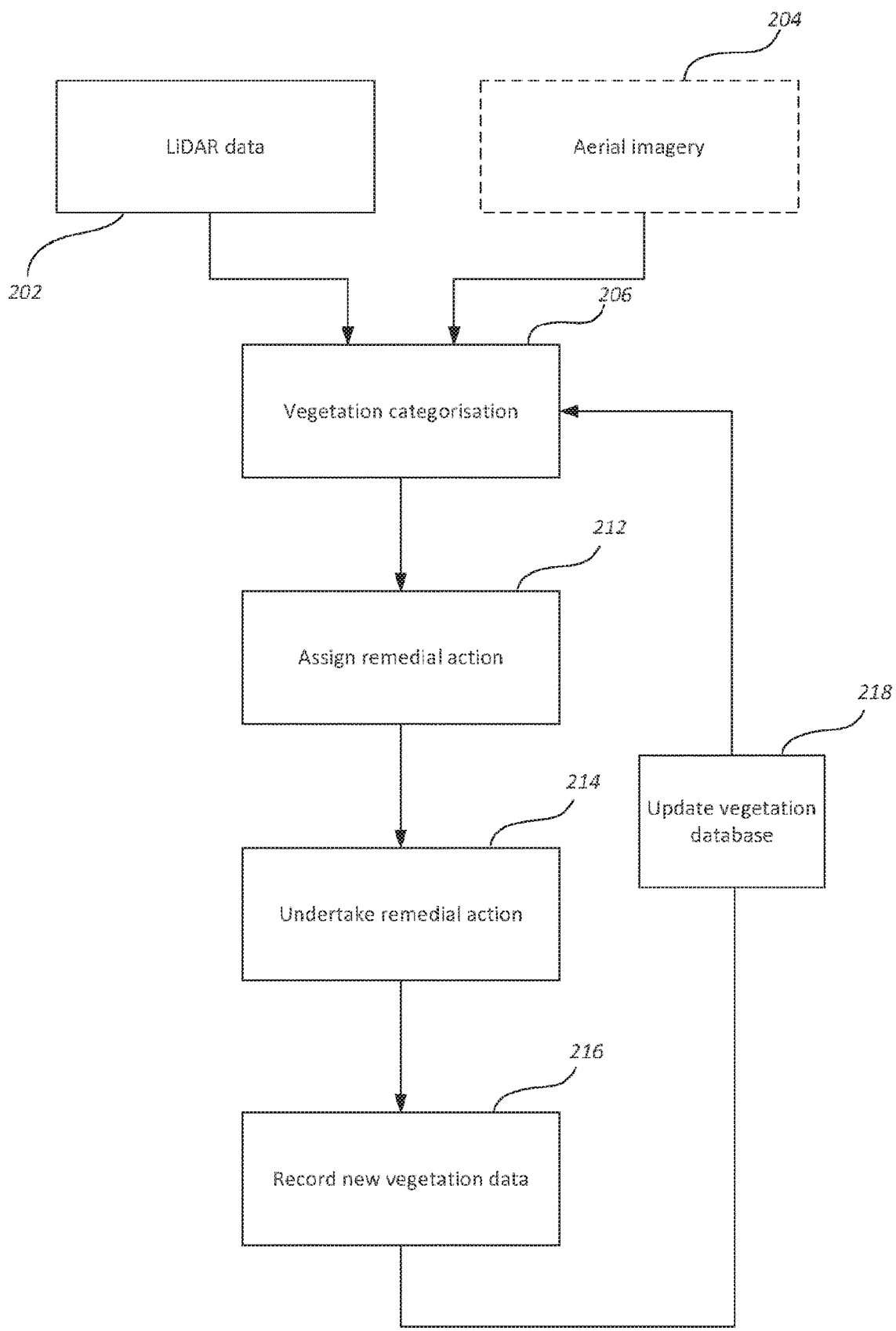
FIG. 7 shows a flow diagram of an example method for re-categorising vegetation following remedial action.

The present system allows for an audit of contractors' work to be undertaken, reducing the risk of incomplete/insufficient remedial action. FIG. 7 shows an extended flow diagram including a number steps following the completion of remedial action 214.

Figure 6:
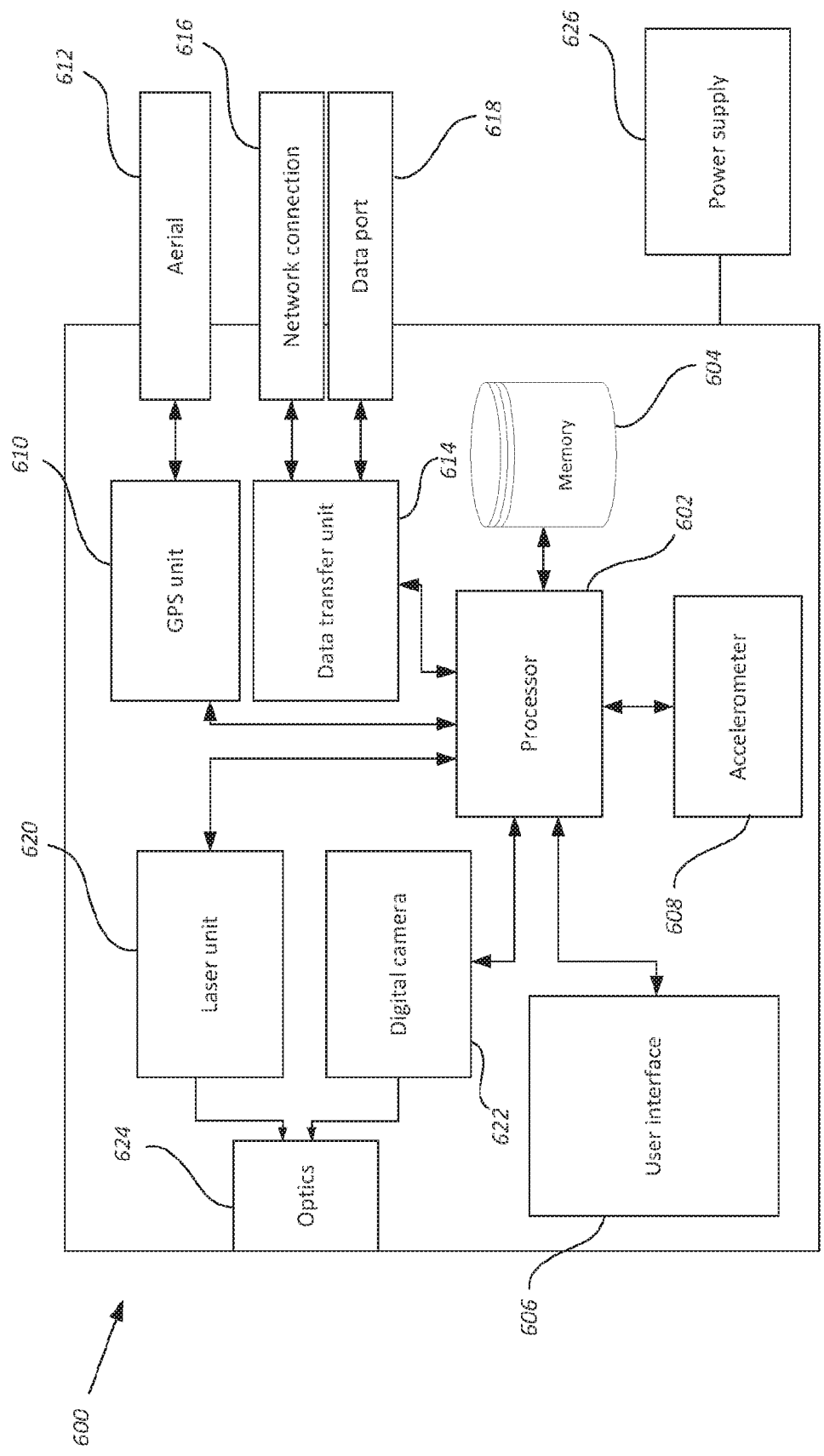
FIG. 6 is a schematic diagram of a distance measuring device.

The contractor is supplied with a mobile device 600 operable to digitally measure distances between objects, a schematic diagram of an example device is shown in FIG. 6. The mobile device 600 is preferably handheld and comprises the following components: a processor 602 and associated memory 604, a user interface 606, accelerometer 608, GPS unit 610 and associated aerial 612, Data transfer unit 614 (and associated network connection 616 and/or data port 618, a laser unit 620, digital camera 622 and optics unit 624. The mobile device 600 is powered by power supply 626, for example, a battery.

In one embodiment, the mobile device 600 is a Mapsight™ device as distributed by ikeGPS LTD, 42 Adelaide Road, Wellington 6021, New Zealand. In another embodiment, the mobile device 600 comprises a smartphone/tablet coupled to a laser scanning device (for example, by Bluetooth™ or other wireless or wired connection). The external laser scanning device may be a Spike™ device, also distributed by ikeGPS.

The laser unit 620 and optics 624 effectively form a ground-based LiDAR unit where measurements of objects back-reflecting a laser beam can be taken.

Using the mobile device 600, a contractor images vegetation that has undergone remedial work (record new vegetation data, step 216). The GPS unit 610 and accelerometer 608 determine the position and orientation respectively of the device 608; this information (potentially together with a distance measurement to the target vegetation) means that the target vegetation can be accurately identified on the central vegetation database (memory) formed of LiDAR data.

The mobile device 600 is operable to determine the shortest distance between the conductor and vegetation by way of back-reflecting laser beams from each element in turn. This is performed by the user pointing the device at the conductor—the device will indicate (via the user interface 606) that a back reflected beam has been received. The user then scans down to the vegetation and another point is registered. Using the data of the device's orientation change and the distances to the different points, the mobile device 600 (using the processor 602 and associated memory 604) can triangulate the distance between the two points.

Furthermore, the mobile device 600 can aid the user in finding vertical (or horizontal) separation distances between the conductor and neighbouring vegetation. As an accurate location of the conductor is known, a point of vegetation situated either directly beneath (or to the side) of this can be performed by the device prompting the user to move the device in that direction (or to move to a different location to perform the measurement). This is of particular use in determining closest distances where perspective effects may otherwise make distances appear greater or smaller.

Figure 8A:
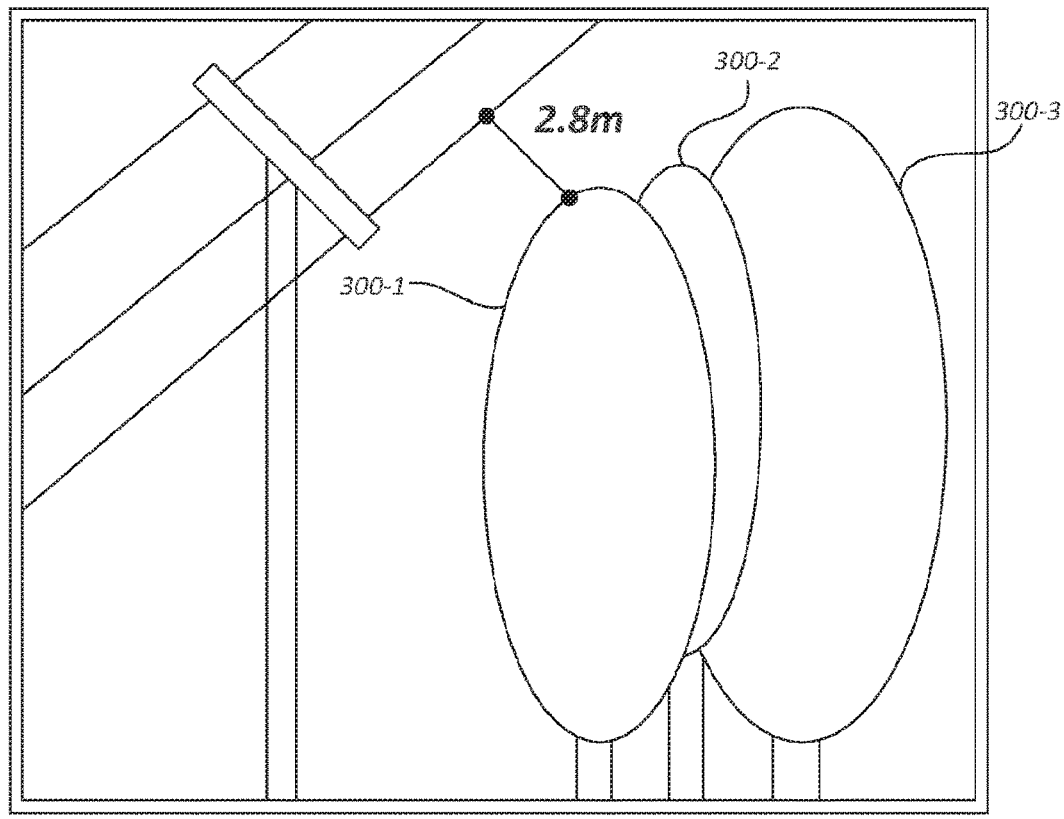
FIGS. 8(a) and (b) show example images taken by a distance measuring device before and after remedial action.
Figure 8B:
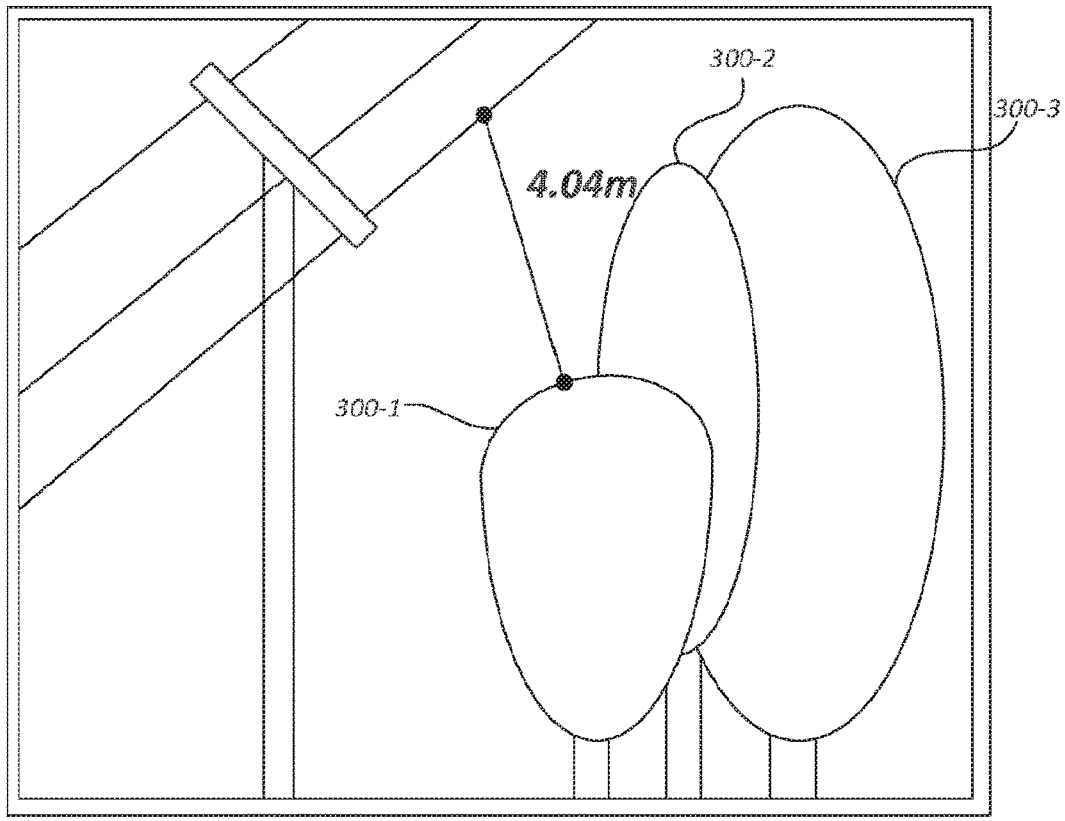
Figure 9:
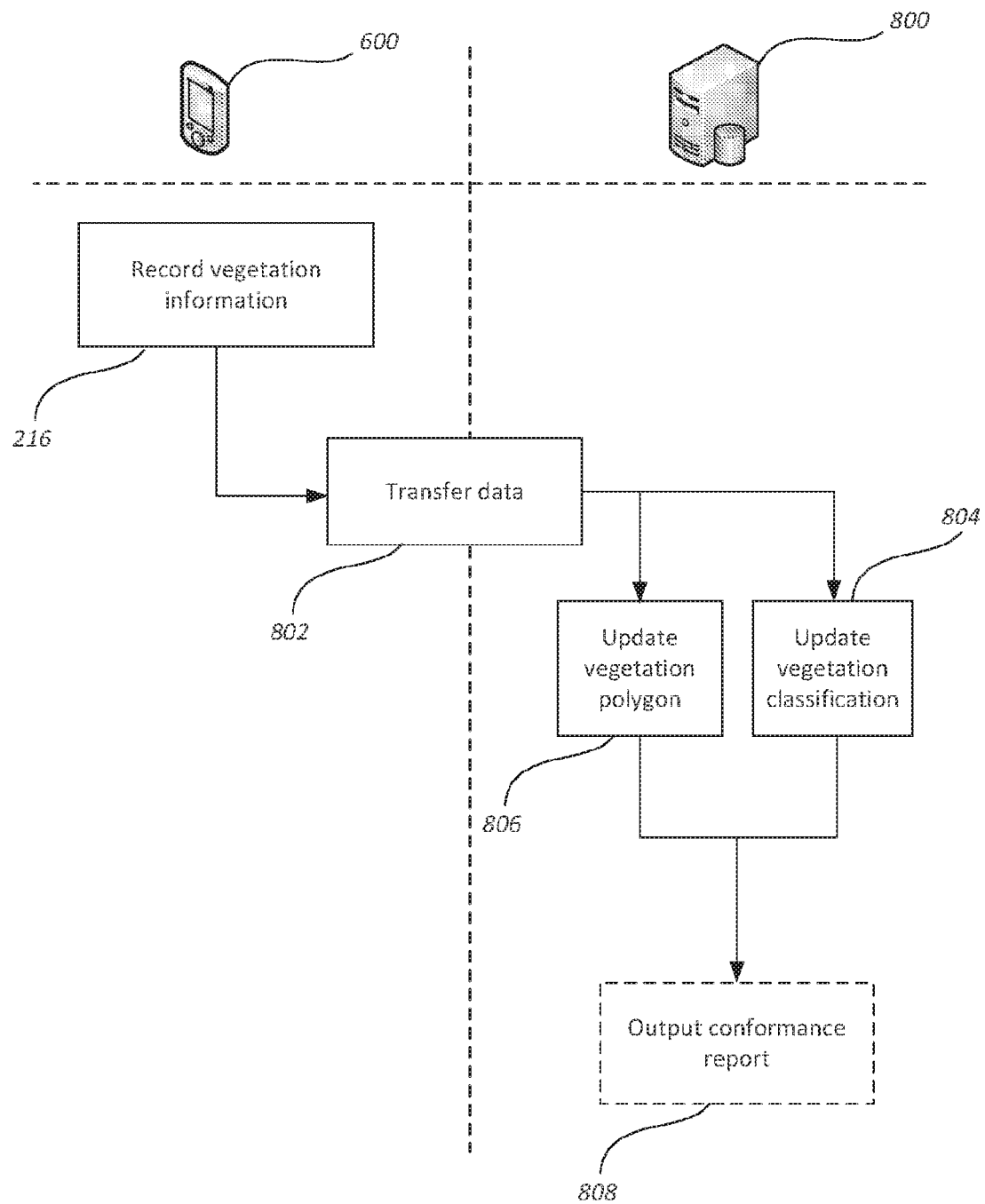
FIG. 9 shows a flow diagram indicating the various steps following the recording of on the ground data.

FIG. 8 shows example measurements taken by the mobile device (a) before, and (b) after remedial action. The device overlays the image with the points at which it is taking the measurement, and the distance it has calculated. This provides the user with immediate feedback as to whether the remedial action is sufficient to meet regulatory requirements. FIG. 8 shows a number of trees 300, but the tree 300-1 is deemed to be the closest to the conductor. Such measurements may be sent to a central server 800 (described in more detail below) along with the location of the measurement (inferred from the GPS location of the device 600 and a measured distance and bearing from the point of measurement, potentially converted into a grid reference) and other metadata such as timestamp/user identification/device identification.

Once the closest distances have been determined, this data may be transferred (see step 802) to a central database 800 (either over a wired or wireless data connection) where vegetation/conductor data corresponding to LiDAR measurements is held, as shown in FIG. 8. This may be performed in batches when the contractor returns to the office at the end of the day/week. Alternatively (and advantageously) the data transfer would occur wirelessly at the time that the remedial action is undertaken. The central database would then be able to process the data received and provide feedback as to whether further remedial action is required or (for example) providing a date for a follow-up visit. In such a scenario the mobile device's network connection 616 may comprise a satellite communication module so as to be able to transfer data in locations where other wireless networks are not available.

The identity of the vegetation is determined by the GPS location and orientation of the mobile device 600 when taking the measurement. The database is then updated to incorporate the change in vegetation following remedial action. Information such as 'closest vertical distance', 'closest horizontal distance', and 'fall arc closest distance' are updated and the vegetation is re-classified at step 804 accordingly. If the contractor undertook the work correctly, this would result in the vegetation being de-classified as posing a risk.

As well as re-categorising the target vegetation, the corresponding polygon may also be updated at step 806. In order to do this, information relating to the extent of the vegetation is provided to the central database which can estimate the polygon shape. This may be performed by merely 'squaring off' the polygon so as to match the updated closest distance to the conductor i.e. one side of the updated polygon will represent a locus of points with respect to the point or points of measurement. In the example of a straight line conductor this corresponds to a straight line, and for a pole it would correspond to an arc A more precise estimation may also be made where multiple distances are provided to the database; in such an example the polygon may be updated by calculating the superposition of several sets of loci corresponding to each measurement.

A similar process may occur with regard to updating the 3D LiDAR visualisations whereby parts of the original visualisation are 'chopped off' to reflect the remedial work undertaken. In the case of a piece of vegetation being completely removed, the contractor may indicate this (either via a photograph indicating the new closest distance being a previously distal polygon or the ground, or manually); the polygon and/or corresponding 3D LiDAR visualisation may then be removed.

Such a feedback procedure allows for an audit trail of works to be compiled which may later be checked by a third party, for example a regulatory body (e.g. The Office of Gas and Electricity Markets—OFGEM) or an auditor. In such a scenario a conformance report 808 may be outputted indicating that the vegetation is now in conformance to the necessary regulations.

A further advantage of the system is that it allows for a single system dealing with collecting LiDAR data, categorising risks, assigning remedial action and confirming that the correct remedial action had been completed as opposed to a separate system for each of these tasks.

In one embodiment, the information sent to the central database 800 is via a dedicated web-page or application. In such a way, relevant information can be entered into a number of standard forms and posted to the database 800 for storage and further analysis. This information is accessible in a central location whereby a manager, auditor or other interested third party can check on the status of the remedial actions as well as being provided with an overview of the status of the stretch of conductor in question or network as a whole.

Figure 10:
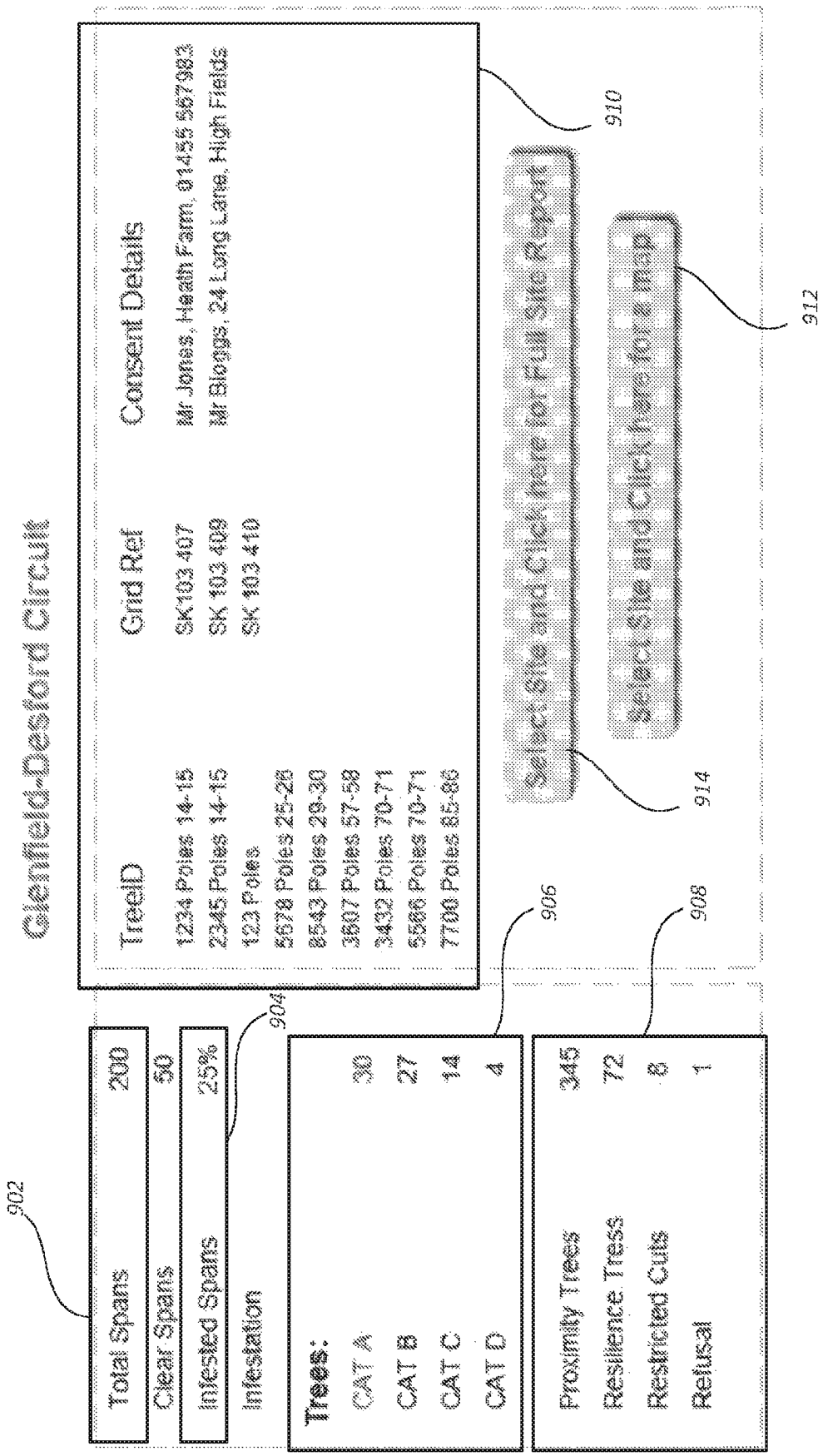
FIG. 10 shows a screen shot showing overview information for an example stretch of conductor.

FIG. 10 shows a screen shot of a 'landing page' for an example stretch of conductor. This details the number of spans in the stretch 902, the number of 'infested spans' 904 (a span with at least one instance of vegetation encroachment), the number of trees in each category 906, and a total number of 'proximity trees' (trees in proximity to the conductor), 'resilience trees' (trees that have the potential to fall and hit a conductor/object, for example due to high winds), restricted cuts (where a landowner has not permitted the full pruning or cut), and refusals (where a landowner has refused the cut entirely), in box 908.

Box 910 details a number of different work sites with the associated co-ordinates and landowner information. Upon selecting one of the worksites, the user can see a map of the site 912 or go to the report for the site 914.

An example site report is shown in FIG. 11. This form includes all the information related to a particular tree, including various fields which are blank for a contractor to fill when visiting the site; these include:

Final clearance 916—This is the measured clearance after remedial work has been carried out, as measured by the mobile device 600.

ike clearance calc 918—This is the measured clearance prior remedial work has been carried out, as measured by the mobile device 600. This figure is likely to be more accurate than the figure calculated from LiDAR data. Alternatively or additionally, this box may indicate the positive or negative final clearance relative to the relevant regulatory requirement.

Species 920—The contractor may specify the species of tree so that for example, the equipment required for future remedial work may be more accurately predicted.

Restricted cut revisit 922—If the landowner does not allow the cut to reach the 'G55/2 Required clearance' the contractor put a date here so as to ensure another visit to maintain a safe clearance. This date may be calculated by the system automatically based on derived growth rates as described above.

The contractor may also change other information relating to the tree and/or work site. Preferably, this information is automatically transmitted to the database 800 by the device 600, but alternatively this form (or a similar form) may be provided on a separate device such as a smartphone or tablet. The presence of this form makes it easy to see exactly what is required of the contractor, and, if they do not meet the requirement, rather than a manager having to follow-up, the system can immediately feed-back an error message indicating that further action is required.

FIG. 12 shows this form following a site visit with the requisite information being uploaded by the contractor. In this example, the contractor has identified the tree as being 'Oak' 920, and measured the initial clearance as being 2.5 m 918. The required clearance is 5 m, but the final clearance has been input as only 4 m 916. This may generate an error message to the contractor—but in this instance the reason for non-compliance is due to a landowner restricting the cut. The contractor thus enters a date to revisit the site 922. A regulator, auditor or other interested third party (for example a landowner) may be provided access to this report so as to verify that the works had been undertaken satisfactorily.

Figure 13:
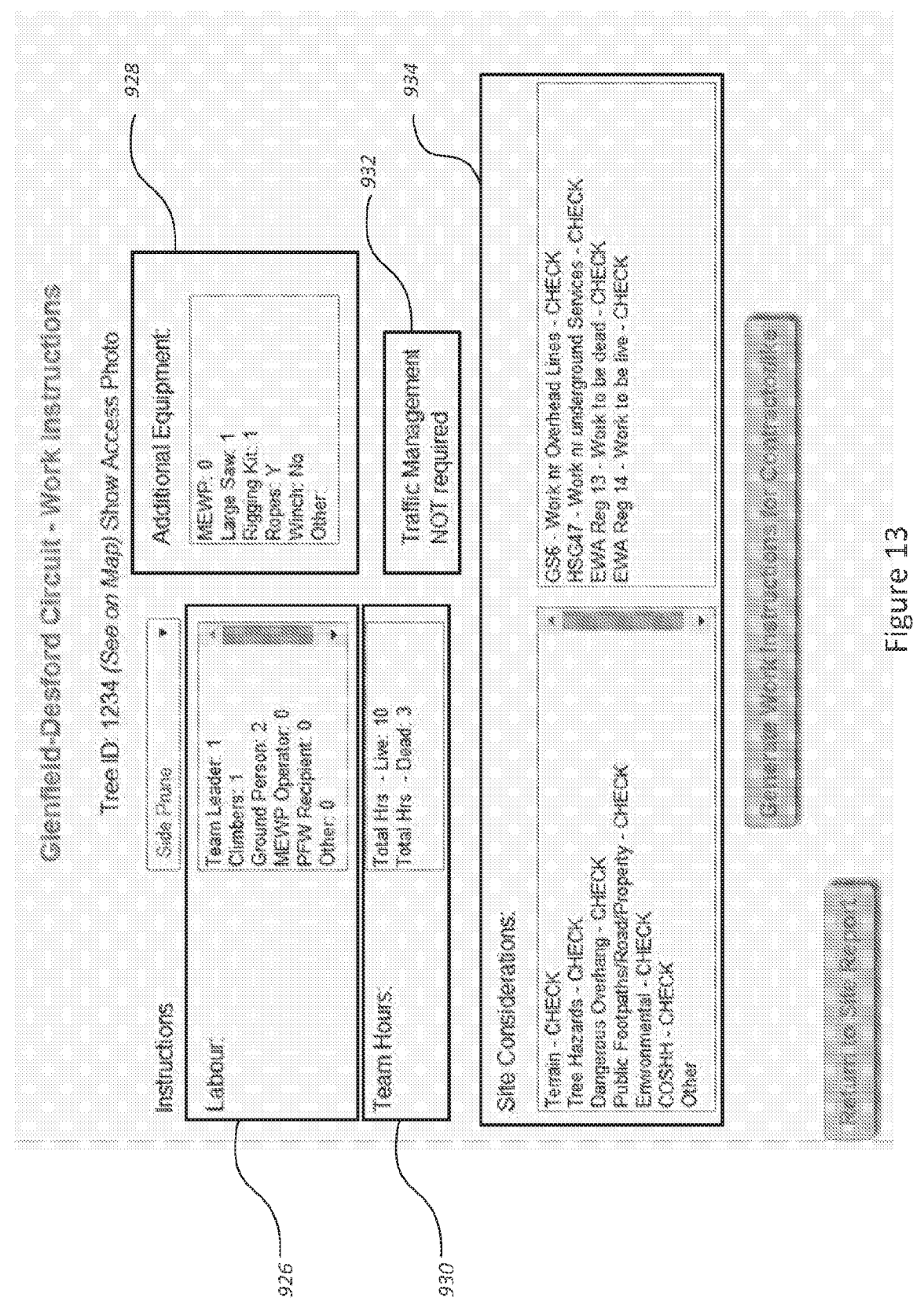

FIG. 13 shows a screen shot of a form to 'generate work instructions' (i.e. suggested remedial action), accessible via button 924. This form is pre-populated with information calculated from information stored in the database 800 relating to the complexity and type of work needed to bring the vegetation into compliance. A manager may amend the information based on personal experience and/or information not available to the database 800.

The sections titled 'labour' 926, 'additional equipment' 930 and 'team hours' 932 detail the various people, equipment and time required to undertake the task; this would vary with the type of task—for example felling a large tree would require many more people, equipment and time than a 'side prune' (as is the case in the example shown in FIG. 12). A section titled 'Traffic management' 932 allows a manger to specify whether traffic management is required— for example if the vegetation in question overhangs a road.

Such information may be determined automatically by the system (for example by analysing map data surrounding the vegetation) and stored in database 800; alternatively it could be added manually by a manager and stored so that it appears automatically the next time remedial action is required for the same area. The final box shown on this screen is 'site considerations' 934; these list relevant legislation/checklists that should be considered when undertaking the remedial work. This may differ depending on the area in which the vegetation is located (e.g. different regions/countries may have different legislation) and also depending on the surroundings (e.g. footpaths, property or underground services).

Figure 14:
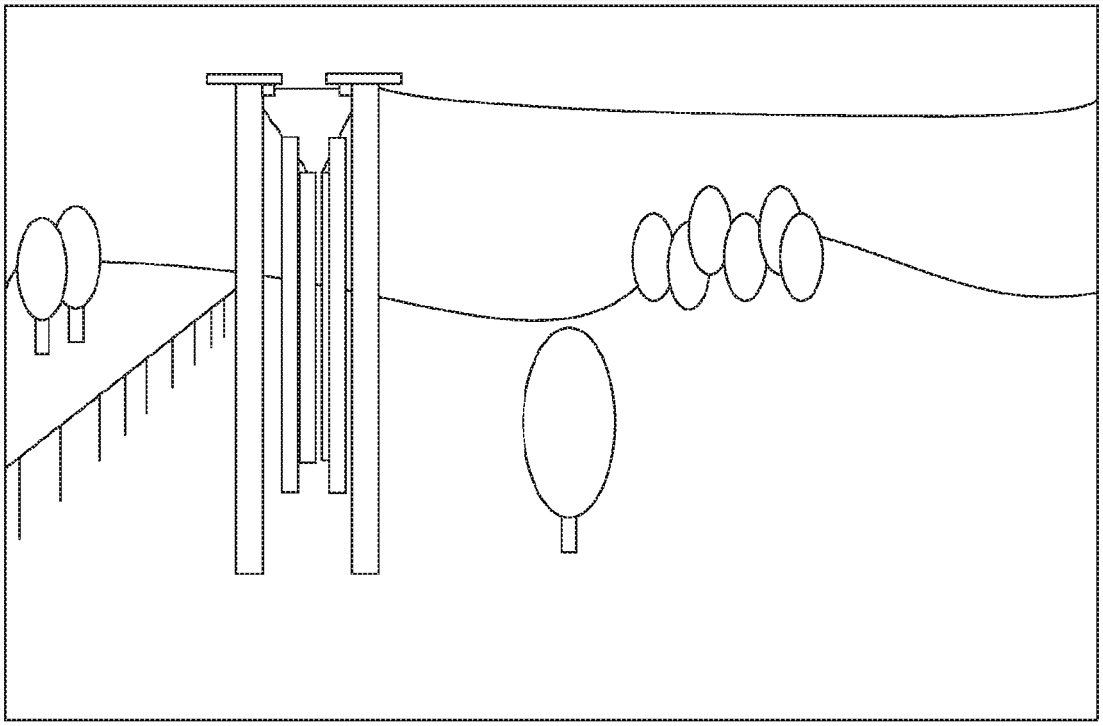
FIG. 14 shows a screen shot/print out of an example set of work instructions that are supplied to a contractor.

FIG. 14 shows a screen shot/print out of the work instructions that are supplied to a contractor. This includes tick boxes which the contractor may complete prior to undertaking the work to indicate they are aware of the various risks/guidelines that must be taken into account. This form and/or the individual elements may be time-stamped when completed so as to provide evidence that a risk-assessment was conducted prior to carrying out any work. Such a form provides another aspect which may be audited in case of an accident or instance of non-compliance with legislation, potentially reducing the burden of responsibility from the network operator/manager.

The work instructions may also include an image and/or coordinates of the access point so as to enable the contractor to identify the correct location to gain access to the work site.

Data recorded 'on the ground' by a contractor may also be used to improve the accuracy of LiDAR data, even if the LiDAR data is more recent than data collected following remedial action. For example if a contractor measures the height of a pole, this is likely to be more accurate than a similar measure taken from an aircraft flying overhead, and the height of a pole is unlikely to have changed between the two measurements. The information held in the central database related to that conductor can then be updated. This database update may prompt a re-categorisation of surrounding vegetation, for example if the height of the pole is lower than previously measured.

Alternatives and Modifications

Various other modifications will be apparent to those skilled in the art for example 'on the ground' data may be collected in other ways that using back reflecting laser beams. One alternative would be to use surveying techniques using a theodolite, an electronic distance meter (or combined in one device, for example as a 'total station').

Although the above description has primarily discussed examples of vegetation potentially impacting 'a conductor', the above applies to other objects such as waterways, railways, roads and other infrastructure or buildings where reducing the risk of vegetation impact/incursion is desired.

It will be understood that the present invention has been described above purely by way of example, and modifications of detail can be made within the scope of the invention.

Reference numerals appearing in the claims are by way of illustration only and shall have no limiting effect on the scope of the claims.

What is claimed is:
1. A method of alleviating vegetation encroachment onto a utility conductor, the method comprising:
scheduling a remedial action for vegetation in dependence on a risk category categorisation;

outputting at a mobile device associated to the remedial action a required clearance for the vegetation, said mobile device being operable to measure distances between objects;

recording by said mobile device a ground observation, said ground observation comprising a distance measurement between said vegetation and a target object;

inputting and storing in a memory information related to the ground observation;

determining an identity of a vegetation from said ground observation, the vegetation corresponding to an existing memory entry;

determining from said identity of the vegetation a required clearance for said vegetation;

updating said memory with said distance measurement; and outputting a conformance report following the remedial action based on said distance measurement and said required clearance as to whether the remedial action was sufficient for re-categorisation of said vegetation.

2. A method according to claim 1 comprising outputting a statement of suggested remedial action based on said distance measurement and said required clearance.

3. A method according to claim 1 wherein the risk category corresponds to a set of regulations.

4. A method according to claim 1 wherein the distance measurement is determined in dependence on a part of a polygon shape.

5. A method according to claim 4 wherein the part of the polygon shape represents a locus from a point or points of measurement.

6. A method according to claim 1 wherein thy: distance is measured by means of back-scattered light (LiDAR).

7. A method according to claim 1 wherein the distance measurement comprises at least one of: a fall-arc distance, and a closest distance.

8. A method according to claim 1 wherein a location of the ground observation is determined so as to determine the identity of the vegetation.

9. A method according to claim 8 wherein a location and orientation of the mobile device is used to determine the identity of the vegetation.

10. A method according to claim 1 wherein the ground observation is wirelessly transmitted via satellite from said mobile device to a central server containing said memory.

11. A method according to claim 1 further comprising:
determining a first set of data relating to said vegetation;
determining data relating to the target object;
determining a second set of data relating to said vegetation;
determining a growth rate of said vegetation from said first and second data sets; and
predicting a future data set relating to said vegetation in dependence on said growth rate.

12. A method according to claim 11 comprising categorising said vegetation into one of a plurality of different risk categories in dependence on said future data set.

13. A method according to claim 12 wherein a schedule of conducting of the remedial action is related to a time when the risk category of said vegetation is predicted to change.

14. A method according to claim 11 wherein the first and second data sets are temporally separated.

15. A method according to claim 1 further comprising:
determining data relating to said vegetation;
determining data relating to the target object; and
categorising said vegetation into one of a plurality of different risk categories in dependence on said data relating to said vegetation and said data relating to the target object.

16. A method according to claim 15 comprising data relating to said vegetation and said data relating to the target object.

17. A method according to claim 16 comprising:
determining the identity of the vegetation of said observations corresponding to an existing memory entry;
determining an updated risk category for said vegetation in dependence on said ground observation; and
updating said memory with said risk category.

18. A method according to claim 15 comprising assigning a remedial action and outputting a statement of suggested remedial action based on said data relating to said vegetation.

19. A method according to claim 18 wherein the statement of suggested remedial action comprises a recommendation of resource allocation for completing the remedial action.

20. A method according to claim 15 wherein said data relating to said vegetation and said data relating to the target object are derived at least in part from at least one of: back-scattered light (LiDAR) data; or images.

* * * * *